United States Patent
Shimizu et al.

(10) Patent No.: US 9,465,701 B2
(45) Date of Patent: Oct. 11, 2016

(54) RELAY DEVICE AND RECOVERY METHOD

(71) Applicant: FUJITSU LIMITED, Kawasaki-shi, Kanagawa (JP)

(72) Inventors: Makoto Shimizu, Oyama (JP); Hidenori Sugai, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 448 days.

(21) Appl. No.: 14/054,401

(22) Filed: Oct. 15, 2013

(65) Prior Publication Data

US 2014/0040679 A1     Feb. 6, 2014

Related U.S. Application Data

(63) Continuation of application No. PCT/JP2011/059763, filed on Apr. 20, 2011.

(51) Int. Cl.
    *G06F 11/00*     (2006.01)
    *G06F 11/16*     (2006.01)
    *H04L 12/861*     (2013.01)
    *G06F 11/07*     (2006.01)

(52) U.S. Cl.
CPC ........ *G06F 11/1666* (2013.01); *G06F 11/0745* (2013.01); *G06F 11/0763* (2013.01); *H04L 49/9057* (2013.01)

(58) Field of Classification Search
CPC ............. G06F 11/0745; G06F 11/076; G06F 11/0763; G06F 11/1666; H04L 49/552; H04L 49/555; H04L 49/557; H04L 49/901; H04L 49/9015; H04L 49/9036; H04L 49/9047; H04L 49/9057
See application file for complete search history.

(56) References Cited

U.S. PATENT DOCUMENTS

| | | | |
|---|---|---|---|
| 5,689,707 A | 11/1997 | Donnelly | |
| 6,918,005 B1 * | 7/2005 | Marchant | G06F 12/023 710/54 |
| 7,145,869 B1 * | 12/2006 | Kadambi | H04L 47/125 370/229 |
| 7,236,456 B2 * | 6/2007 | Tzeng | H04L 47/10 370/230 |

(Continued)

FOREIGN PATENT DOCUMENTS

| | | |
|---|---|---|
| JP | 9-244948 | 9/1997 |
| JP | 11-102325 | 4/1999 |

(Continued)

OTHER PUBLICATIONS

JPOA—Notice of Rejection Grounds dated Apr. 8, 2014 for the corresponding Japanese patent application No. 2013-510784 with partial English translation.

(Continued)

*Primary Examiner* — Marc Duncan
(74) *Attorney, Agent, or Firm* — Fujitsu Patent Center

(57) ABSTRACT

A relay device for dividing a storage device into a plurality of unit areas, assigning an unused unit area from among the plurality of unit areas to received channel-specified data, and performing at least one of adjustment of a transmission timing of the data and conversion of the data by using the assigned unit area, is disclosed. The relay device includes an error detector configured to detect an error where the unit area from which the data is to be read is not specified; and an error control configured to recognize a channel of data stored in the unit area that is not specified due to the error detected by the error detector as a target channel, and to invalidate an assignment of the unit area to the recognized target channel.

4 Claims, 28 Drawing Sheets

(56) References Cited

U.S. PATENT DOCUMENTS

| | | | | |
|---|---|---|---|---|
| 2002/0009082 | A1* | 1/2002 | Matsuoka | H04L 49/103 370/390 |
| 2004/0123038 | A1* | 6/2004 | Shami | G06F 12/023 711/132 |
| 2005/0163141 | A1* | 7/2005 | Katayama | H04L 12/5693 370/412 |
| 2008/0155202 | A1* | 6/2008 | Kurosaki | H04L 49/103 711/147 |

FOREIGN PATENT DOCUMENTS

| | | |
|---|---|---|
| JP | 11-331260 | 11/1999 |
| JP | 2000-200210 | 7/2000 |
| JP | 2000-236334 | 8/2000 |
| JP | 2000-267905 | 9/2000 |
| JP | 2002-9827 | 1/2002 |
| JP | 2002-57712 | 2/2002 |
| JP | 2007-141193 | 6/2007 |
| JP | 2008-160705 | 7/2008 |

OTHER PUBLICATIONS

International Search Report, mailed in connection with PCT/JP2011/059763 and mailed Aug. 2, 2011.

Notification of Transmittal of Copies of Translation of the International Preliminary Report on Patentability (Form PCT/IB/338, Form PCT/IB/373 & Form PCT/ISA/237), PCT/2011/059763, 7 pages, dated Oct. 31, 2013.

* cited by examiner

| | WRITE PTR CONTROL TABLE ||
|---|---|---|
| Ch. 0 | CURRENT PTR | Next PTR |
| Ch. 1 | CURRENT PTR | Next PTR |
| : | : | : |
| Ch. N | CURRENT PTR | Next PTR |

FIG. 5A

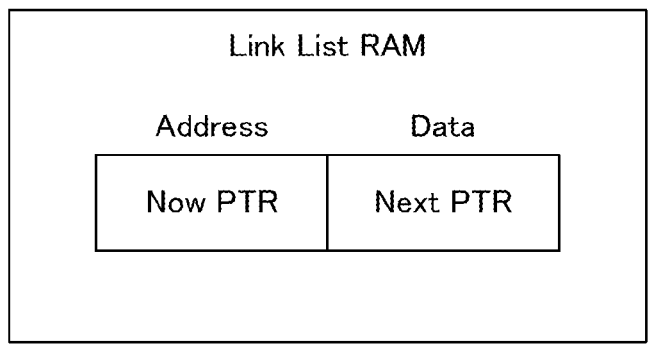
F I G. 5 B

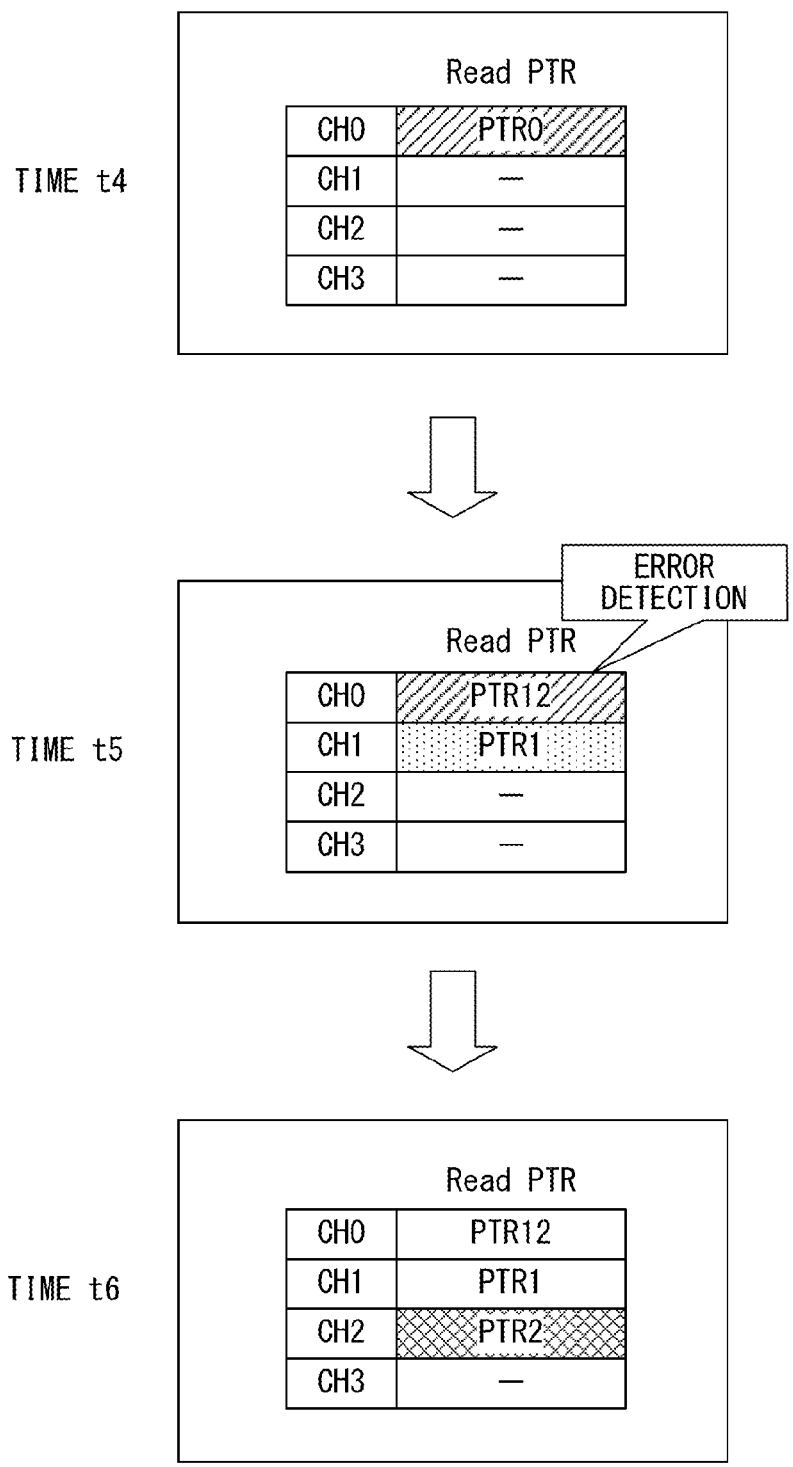
F I G. 1 1 A

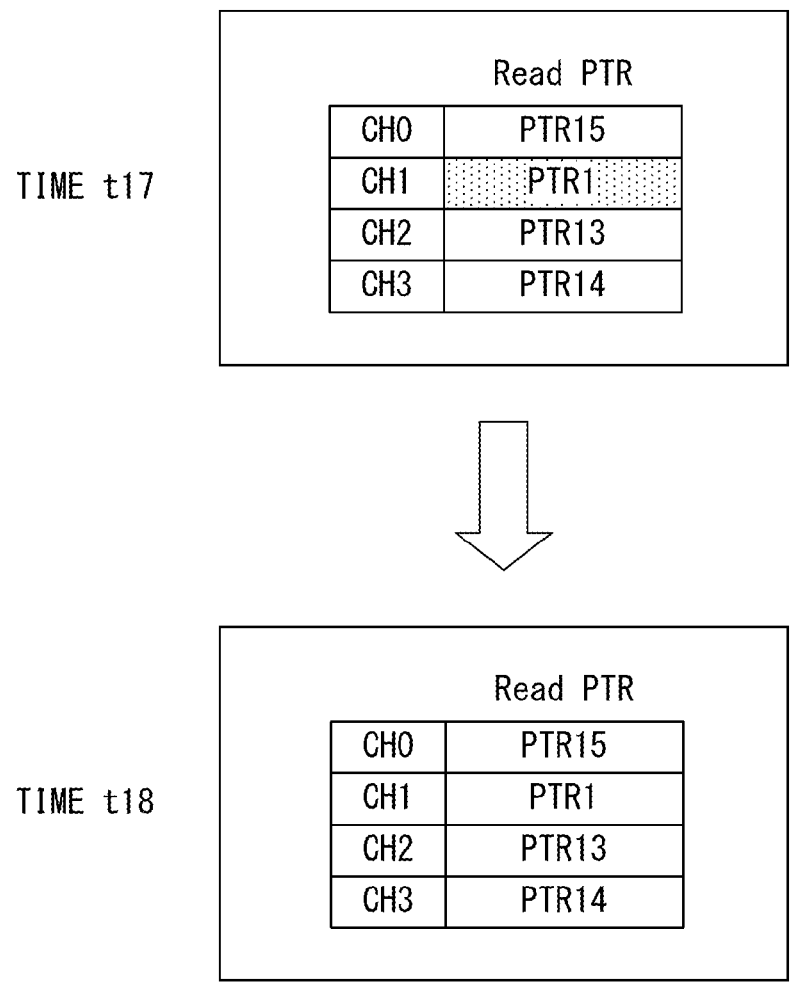
F I G. 1 1 B

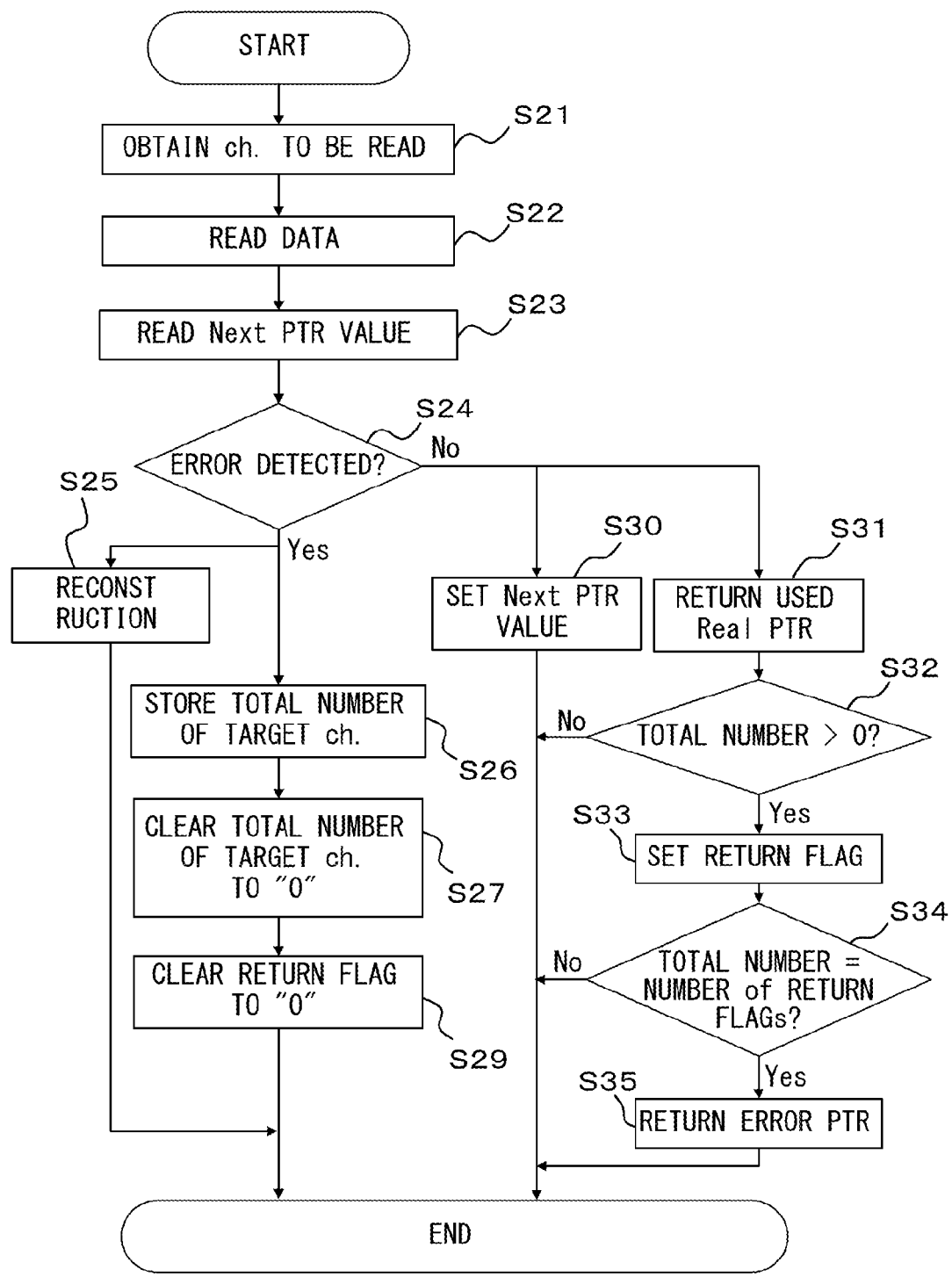
F I G. 15

RELAY DEVICE AND RECOVERY METHOD

CROSS-REFERENCE TO RELATED APPLICATION

This application is continuation application of International Application PCT/JP2011/059763, filed on Apr. 20, 2011 and designated the U.S., the entire contents of which are incorporated herein by reference.

FIELD

The embodiments discussed herein are related to a technique in which data is relayed.

BACKGROUND

In recent years, data communication services have shown dramatic leaps in development due to the rapid proliferation of the Internet, and data communication using packets such as IP (Internet Protocol) packets is now becoming mainstream. In data communication services, demand for a service that strongly requires a real-time property such as audio or video data transmission is increasing remarkably. Accordingly, an increase in capacity due to an increasing data communication rate and an increase in communication reliability is significant for relay devices that are used as nodes of a router or switch in networks where data communication is performed.

Some of the above relay devices are provided with a data encapsulation (division/reconstruction) function or a QoS (Quality of Service) function that secures communication quality by controlling data delay or bandwidth. A storage device that stores data is essential for managing encapsulation and the transmission timing of the data. Hereinafter, such a storage device will be referred to as a "packet buffer".

A packet buffer is divided into certain unit areas (address areas), and these unit areas are managed by data referred to as a pointer (PTR). As a method for managing a packet buffer by using pointers as above, a chain management method is known.

In the chain management method, an unused unit area is assigned to store data on a channel-by-channel basis, and data continuity is managed by using pointers. In such management, it is necessary to specify a pointer that has been assigned to a channel and the order in which the pointer was assigned to the channel on a channel-by-channel basis. For this reason, order specifying information (chain management information) is essential in the chain management method. Usually, the order in which the pointer was assigned is managed by the data indicating the pointer that is assigned after the present pointer on a pointer-by-pointer basis (link information).

The chain management information is stored in a specified storage device. An error may occur when data is written into or read from the storage device. When an error occurs in the data of the link information of the chain management information, not only the pointer indicated by the data in which the error has occurred but also the pointers subsequent to that pointer are not specified. Accordingly, an error may result in an increase in the number of unit areas that are not released in the packet buffer (memory leak). Due to high-density integration and reduction in driving power derived from advanced devices, errors tend to occur more easily.

When such a memory leak occurs, the available capacity of a packet buffer becomes smaller by the amount of the unit areas that are not released. Accordingly, throughput deterioration due to the back pressure on a relay device or data loss due to the overflow in a packet buffer occurs easily. The pointer data in which an error has occurred has been assigned to a channel, and it becomes impossible to specify the data for such a channel and thus data transmission (relay) is not performed.

Recently, the demand for reliability in the network infrastructure and communication quality has been ever increasing due to the development of cloud technology or the like. Such throughput deterioration or data loss has a great adverse effect on the communication quality.

In view of the above circumstances, also in conventional relay devices, error monitoring is performed on the access to a storage device. However, performing error monitoring by using an ECC (Error Correcting Code) or the like does not guarantee successful error correction on the data in which an error has occurred. This means that it is not always the case that a memory leak caused by an error will be successfully handled.

A memory leak caused by a non-correctable error may be resolved by resetting the relay device. However, when the relay device is reset, there will be a period during which the relay device is not operating, and all the data stored in the packet buffer is lost. Consequently, the quality of the data communication service significantly drops. In view of these circumstances, the capability to deal with a memory leak caused by a non-correctable error is crucial.

As a measure to deal with a memory leak, a technique may be adopted in which the operating time of each unit area of a packet buffer is measured and the unit areas that have been used for a period equal to or longer than a certain period of time are released. However, such a measure is not realistic. This is because, normally, the number of the channels handled in a relay device is very large, and the desired communication rate is different for each channel. In other words, this is because, normally, control becomes very complicated and the resources used for the control are enormous.

[Patent Document 1] Japanese Laid-open Patent Publication No. 09-244948

[Patent Document 2] Japanese Laid-open Patent Publication No. 2000-200210

[Patent Document 3] Japanese Laid-open Patent Publication No. 2002-057712

[Patent Document 4] Japanese Laid-open Patent Publication No. 2007-141193

SUMMARY

According to an aspect of the embodiments, a relay device for dividing a storage device into a plurality of unit areas, assigning an unused unit area from among the plurality of unit areas to received channel-specified data, and performing at least one of adjustment of a transmission timing of the data and conversion of the data by using the assigned unit area, is disclosed. The relay device includes an error detector configured to detect an error where the unit area from which the data is to be read is not specified; and an error controller configured to recognize a channel of data stored in the unit area that is not specified due to the error detected by the error detection unit as a target channel, and to invalidate an assignment of the unit area to the recognized target channel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A illustrates the structure of a write pointer control table;

FIG. 5B illustrates the content stored in a Link List RAM;

FIG. 11A illustrate how the contents of a read pointer control table change;

FIG. 11B illustrate how the contents of a read pointer control table change;

FIG. 15 is a flowchart of reading processes.

DESCRIPTION OF EMBODIMENTS

Some embodiments of the present invention will be described below in detail with reference to the drawings.

Figure 1:
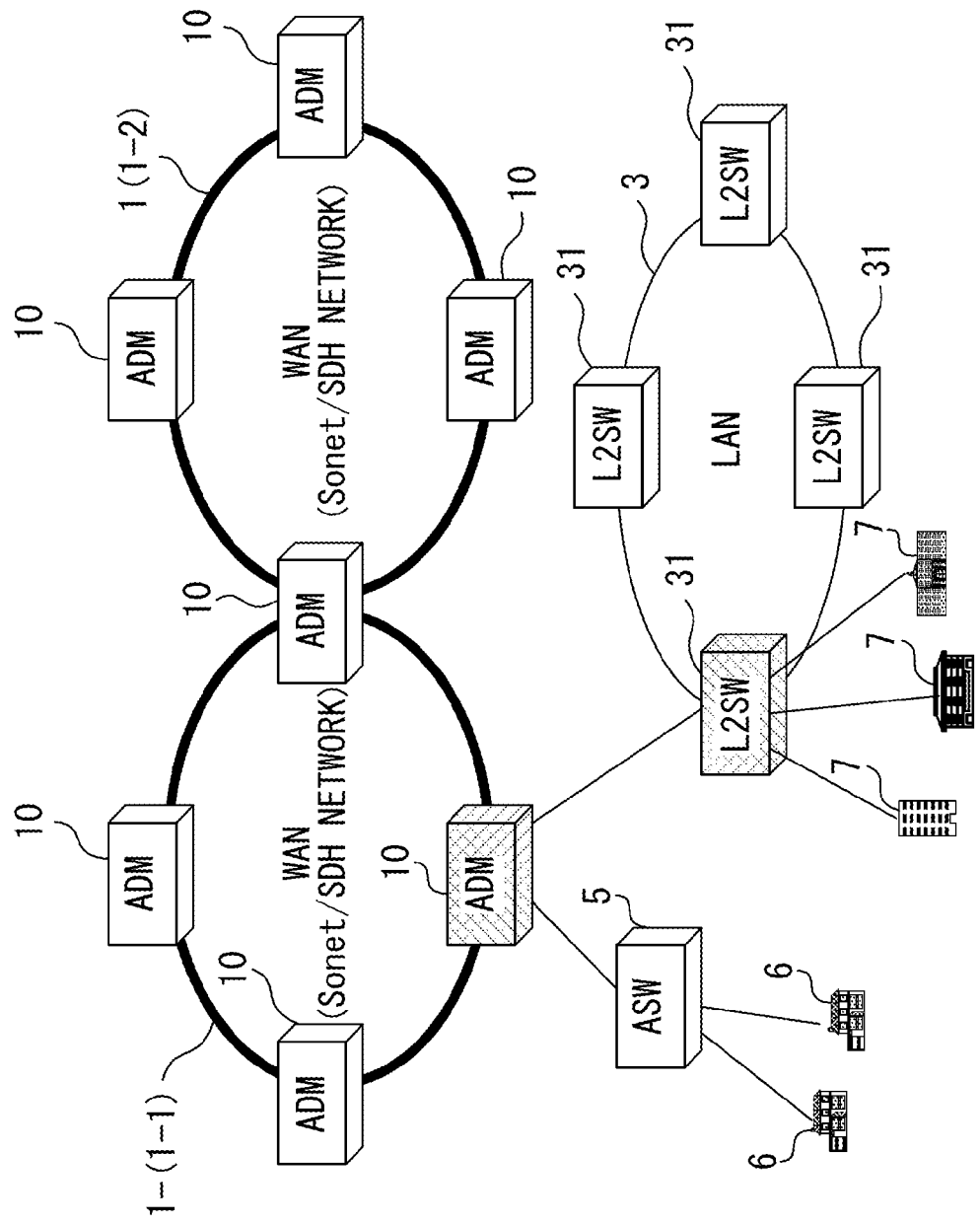
FIG. 1 illustrates the configuration of a network to which relay devices according to the present embodiment are applied.

FIG. 1 illustrates the configuration of a network to which relay devices according to the present embodiment are applied. In a single system to which the present embodiment is applied, a memory leak which has occurred in a storage device due to the occurrence of a non-correctable error may be handled automatically.

In FIG. 1, two WANs (Wide Area Network) 1 (1-1, 1-2) and one LAN (Local Area Network) 3 are illustrated as the network. The WANs 1 are ring-shaped Sonet/SDH (Synchronous Optical NETwork/Synchronous Digital Hierarchy) networks using a plurality of ADMs (Add-Drop Multiplexer) 10. These two WANs 1-1 and 1-2 are connected by one ADM 10. The LAN 3 is a ring-shaped Ethernet (registered trademark) network using a plurality of L (Layer) 2 switches 31. The WAN 1-1 is connected to the LAN 3 via the ADM 10 of the WAN 1-1 and the L2 switch 31 of the LAN 3. A relay device according to the present embodiment is implemented by being provided for the ADM 10. Alternatively, a relay device according to the present embodiment may be provided on the L2 switch 31.

Each of the ADMs 10 provided for the WAN 1 inputs and extracts a signal (data) to/from the WAN 1. The ADM 10 inputs a signal from a node 6 connected to an ASW (Aggregate SW) 5 to the WAN 1-1, and extracts a signal to be transferred to the ASW 5 from the WAN 1-1 and transfers to the ASW 5. The ADM 10 performs a similar transferring process with the L2 switch 31 of the LAN 3. The L2 switch 31 connects, for example, a node 7 to the LAN 3.

The ADM 10 sends and receives a signal in the form of a packet to/from the L2 switch 31 of the LAN 3. When a packet is received, the ADM 10 encapsulates the packet, and inputs to the WAN 1-1 a segment obtained by the encapsulation. When a segment to be transferred to the L2 switch 31 is received, the ADM 10 creates a packet from the received segment, and transfers the created packet to the L2 switch 31. A relay device according to the present embodiment is provided for the ADM 10 so as to realize signal transmission and reception between the WAN 1-1 and the LAN 3.

Figure 2:
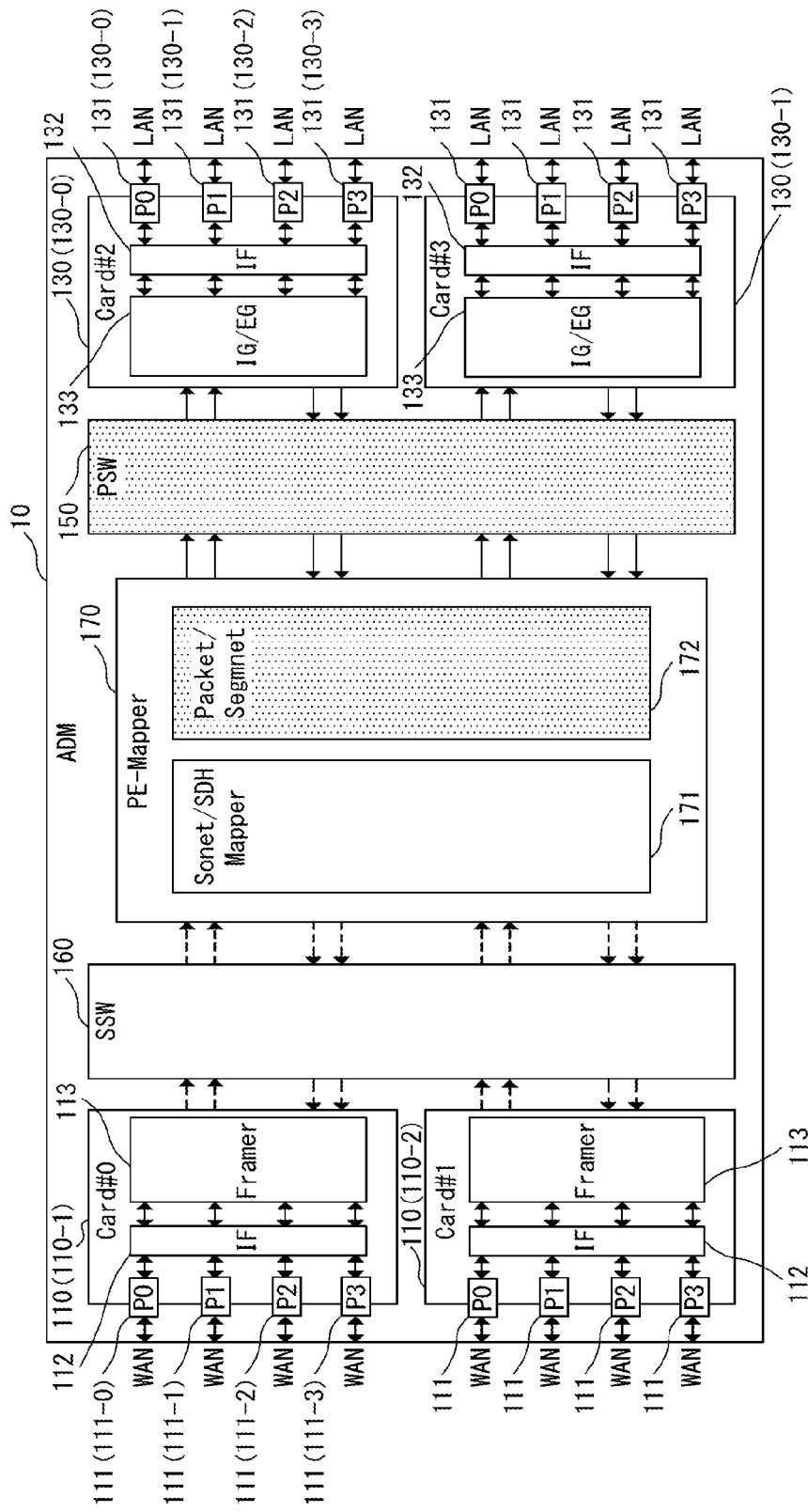
FIG. 2 illustrates the configuration of an ADM to which a relay device according to the present embodiment is applied.

FIG. 2 illustrates the circuit configuration of an ADM. In FIG. 2, dotted line arrows indicate the flow of a frame of Sonet/SDH, and solid line arrows indicate the flow of a packet.

As illustrated in FIG. 2, the ADM 10 includes four terminal cards 110-1, 110-2, 130-1, and 130-2, SSW (Sonet SW) 160, PSW (Packet SW) 150, and a PE-M (Packet Engine Mapper) 170.

The two terminal cards 110 (110-1, 110-2) are used for the WAN 1, and each of the terminal cards 110 includes four ports 111 (111-0 to 111-3), an interface (IF) 112 connected to the ports 111, and a framer 113. A frame received by the ports 111 is inputted to the framer 113 through the interface 112, and the framer 113 outputs the frame to the SSW 160. The SSW 160, by outputting the inputted frame from PE-M 170 to the ports 111 through the interface 112, outputs the input frame to the WAN 1-1.

The SSW 160 is a cross-connect switch for a path level of Sonet/SDH. The SSW 160 performs directional path switching for the frames outputted from the terminal card 110-1 or 110-2, and outputs the frames to a PE-M 170. Moreover, the SSW 160 performs directional path switching for the frames outputted from the PE-M 170, and outputs the frames to the terminal card 110-1 or 110-2.

Two terminal card 130-1 and 130-2 are used for the LAN 3, and each of the terminal cards 130 includes four ports 131 (131-0 to 131-3), an interface (IF) 132 connected to the ports 131, and an IG/EG (Ingress/Egress) 133. The packet from the PSW 150 is sent to the LAN 3 (i.e., the L2 switch 31)

through the IG/EG 133, the interface 132, and the port 131. Moreover, the packet from the LAN 3 (i.e., the L2 switch 31) is outputted to the PSW 150 through the IG/EG 133, the interface 132, and the port 131. The PSW 150 performs directional path switching for the packets between the PE-M 170 and the two terminal cards 130-1 and 130-2.

The PE-M 170 performs data encapsulation (division/reconstruction) so as to enable data communication between the LAN 3 and the WAN 1. In order to perform encapsulation, a Sonet/SDH mapper 171 and a packet/segment mapper 172 are provided. The PE-M 170 may includes at least one processor such as a central processing unit (CPU) and the like and one memory in which a program to be executed to realize functions of the PE-M 170 may be stored. However, at least part of the PE-M 170 may be designed as an application specific integrated circuit, for example.

The packet/segment mapper 172 divides the packet inputted from the PSW 150 side (i.e., the LAN 3 side) into segments, and outputs the obtained segments to the Sonet/SDH mapper 171. Moreover, the packet/segment mapper 172 constructs a packet by using the segments inputted from the Sonet/SDH mapper 171, and outputs the constructed packet to the PSW 150. The Sonet/SDH mapper 171 outputs the segments inputted from the SSW 160 (i.e., from the WAN 1 side) to the packet/segment mapper 172, and performs mapping of the segments inputted from the packet/segment mapper 172 so as to be outputted to the terminal card 110 to through the SSW 160.

Figure 3:
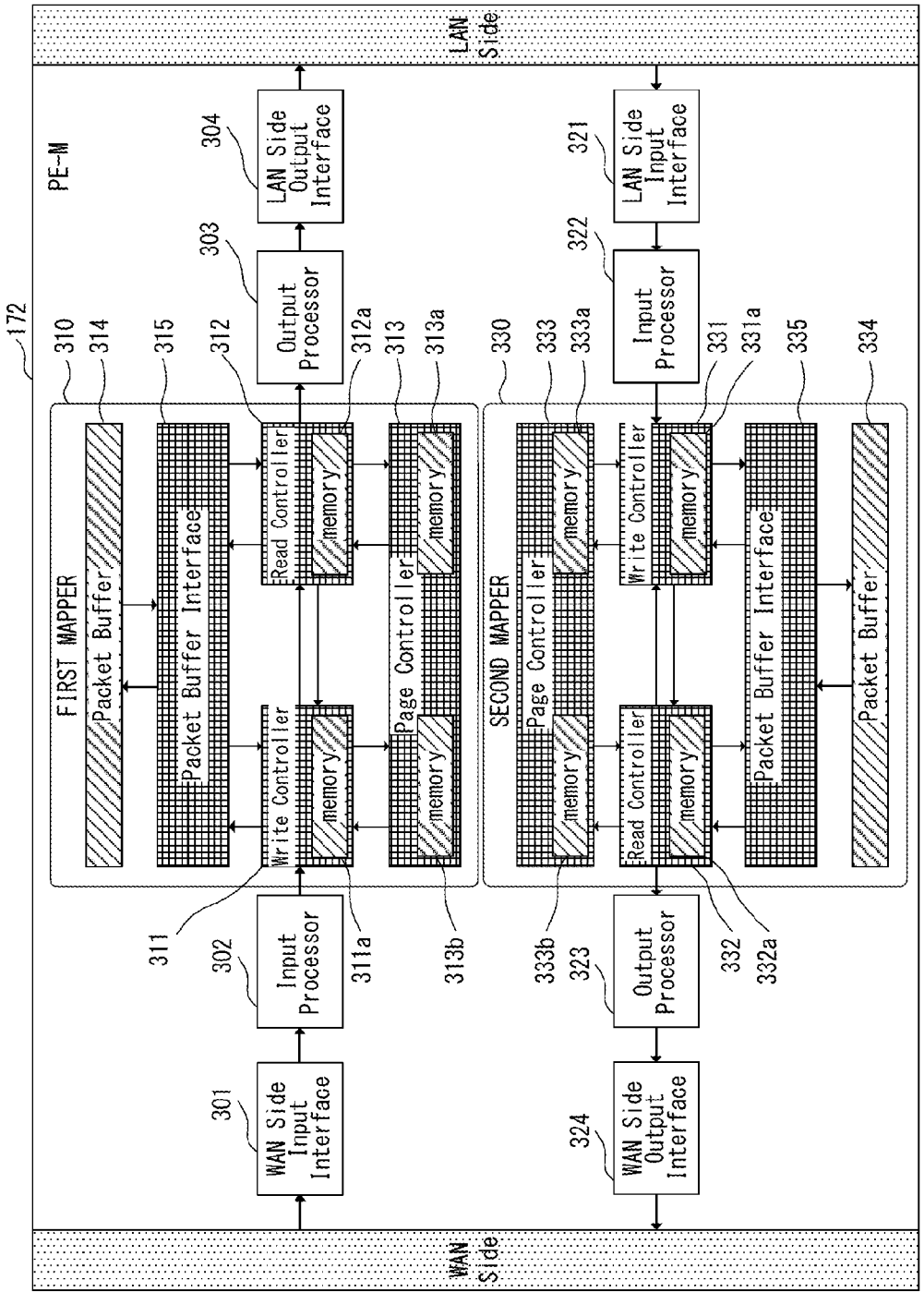
FIG. 3 illustrates the configuration of a packet/segment mapper.

FIG. 3 illustrates the circuit configuration of a packet/segment mapper.

As illustrated in FIG. 3, the packet/segment mapper 172 includes a first mapper 310 and a second mapper 330. The first mapper 310 constructs a packet from segments. The segments outputted from the Sonet/SDH mapper 171 are inputted to the first mapper 310 through an input interface 301 and an input processing part 302. The packet outputted from the first mapper 310 is inputted to the PSW 150 through an output processing part 303 and an output interface 304.

The second mapper 330 divides a packet into segments. The packet outputted from the PSW 150 is inputted to the second mapper 330 through an input interface 321 and an input processor 322. The segments outputted from the second mapper 330 are inputted to the SSW 160 through an output processor 323 and an output interface 324. The first mapper 310 includes a write controller (a write control circuit) 311, a read controller (a read control circuit) 312, a page controller (a page control circuit) 313, a packet buffer 314, and a packet buffer interface 315.

Figure 5C:
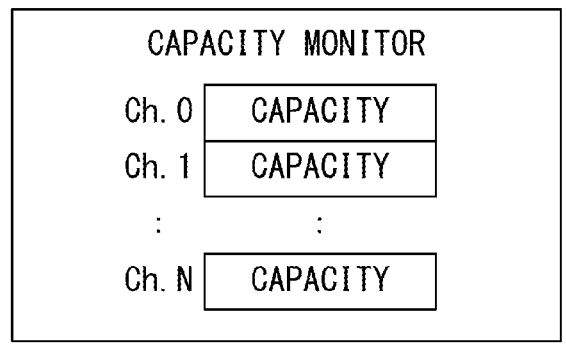
FIG. 5C illustrates the content stored in a capacity monitor.
Figure 5D:
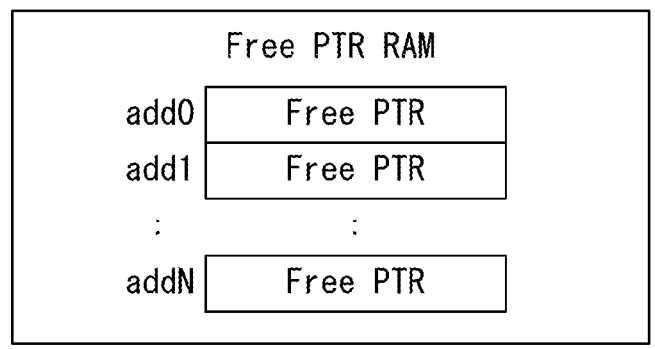
FIG. 5D illustrates the content stored in a Free PTR RAM.
Figure 5E:
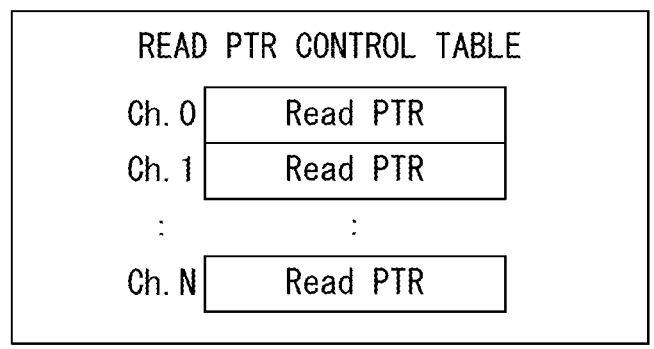
FIG. 5E illustrates the structure of a read pointer control table.
Figure 5F:
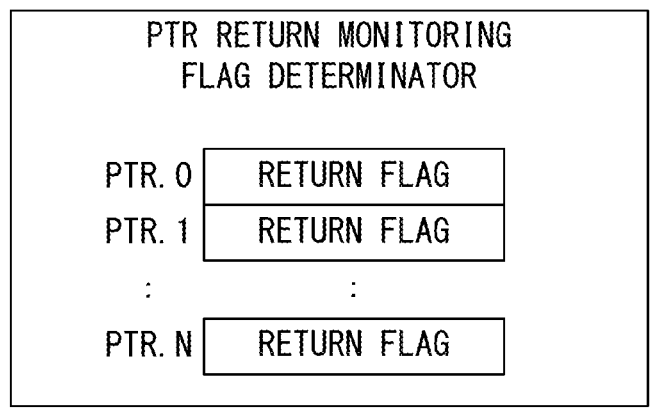
FIG. 5F illustrates the content stored in a PTR return monitoring flag determinator.
Figure 5G:
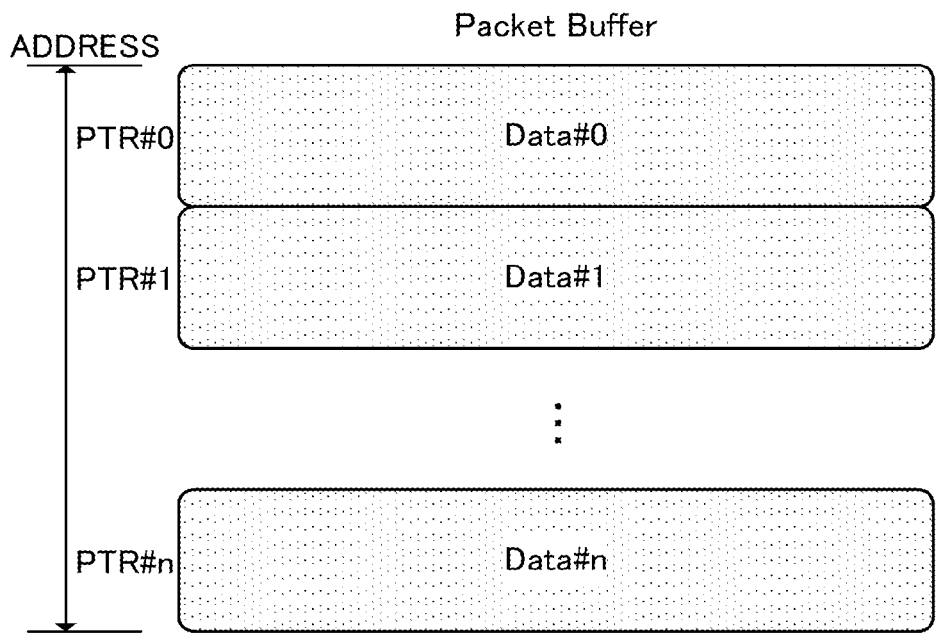
FIG. 5G illustrates how data is stored in a packet buffer.

The packet buffer 314 is a memory used to construct a packet from segments. As illustrated in FIG. 5G, the packet buffer 314 is divided into certain unit areas (address areas), and these unit areas are managed by data referred to as a pointer (PTR). "PTR#0" to "PTR#n" depicted in FIG. 5G indicate pointers that are different from each other. The packet buffer interface (hereinafter, abbreviated as "PBI") 315 is used to realize the access to the packet buffer 314. Hereinafter, the unit area will be referred to as a "pointer (or a pointed (unit) area)", and the data of a pointer will be referred to as a "pointer value" or a "value of a pointer".

The write controller 311 selects a unit area in the packet buffer 314 to which the segments inputted from the input processor 302 are to be written, and writes the segments into the selected unit area via the PBI 315. The read controller 312 selects a pointer that points the unit area from which segments are to be read in the packet buffer 314, and reads the segments from the selected unit area via the PBI 315.

The page controller 313 realizes QoS control or the like by controlling the reading process of segments from the packet buffer 314 being performed by the read controller 312.

The segments and packets received by the ADM 10 are managed by channels, and the priority (communication rate) of the data received in the form of segments or packets are set for each channel. The priority of data is set according to ports, protocols, or reservations that are used for transmitting and receiving data. As described above, segments as well as channel numbers are inputted to the inputted interface 301, and the input segments and channel numbers are outputted to the write controller 311. Accordingly, the page controller 313 performs QoS control for each channel.

The write controller 311 is provided with a memory 311a, and a write pointer control table is stored in the memory 311a. The write pointer control table is used to manage a pointed (unit) area into which segments are to be written for each channel. As depicted in FIG. 5A, the value of a pointer which points the unit area into which the next data (segment) is to be written (depicted as "Current PTR" in FIG. 5A, hereinafter, this will be referred to as "current pointer value") and the value of a pointer into which the one after the next data (segment) is to be written (depicted as "Next PTR" in FIG. 5A, hereinafter, this will be referred to as "next pointer value") are stored in the write pointer control table corresponding to a channel—(channel number).

The page controller 313 is provided with a Link List RAM 313a and a Free PTR RAM 313b. The page controller 313 may includes a processor such as a central processing unit (CPU) and the like. The Link List RAM 313a is used to manage the order in which data is read on a pointer-by-pointer basis, i.e., the data relation. For that purpose, as depicted in FIG. 5B, the value of the pointer which points the unit area storing the next data (depicted as "Next PTR" in FIG. 5B, hereinafter, this will be referred to as "next pointer value") is stored in the Link List RAM 313a corresponding to a current pointer value.

The Free PTR RAM 313b is used to manage unused pointers among the pointers on a FIFO (First-In First-Out) basis. As depicted in FIG. 5D, a value of an unused pointer (depicted as "Free PTR") is stored in the addresses (depicted as "add0" to "addN") of the Free PTR RAM 313b.

The read controller 312 is provided with a memory 312a, and a read pointer control table is stored in the memory 312a. The read pointer control table is used to manage a pointer which points the unit area from which data is to be read on a channel-by-channel basis. As depicted in FIG. 5E, the value of a pointer pointing the unit area from which data (segment) is to be subsequently read (depicted as "Read PTR" in FIG. 5E) is stored in the read pointer control table corresponding to a channel—(channel number) by-channel basis.

Once data (segment) is inputted, the write controller 311 refers to the write pointer control table of the memory 311a by using the channel number of the data. Then, the write controller 311 reads a current pointer value with which the data is to be stored, and writes the data into the unit area with the read current pointer value. The next pointer value corresponding to the channel numbers of the write pointer control table and the pointer value stored at the head of the Free PTR RAM 313b are stored as the current pointer value and the next pointer value, respectively. To the pointer value (unit area) that stores the current pointer value of the Link List RAM 313a, the current pointer value in the updated write pointer control table is stored. As described above, the data (segment) that is stored in the packet buffer 314 on a pointer-by-pointer basis may be tracked on a channel-by-channel basis.

The read controller 312 receives an instruction from the page controller 313 as to what channel data is to be read from. Once an instruction regarding the channel is received, the read controller 312 obtains a pointer value of the specified channel from the read pointer control table of the memory 312a, and reads data from the pointed unit area with the obtained pointer value. The pointer value of the specified channel corresponding to the read pointer control table is updated to the pointer value read from the Link List RAM 313a. The pointer value that is used when the pointer value is read from the Link List RAM 313a is equal to the value of the pointer with which the data is read from the packet buffer 314. If such a pointer value is stored in the read pointer control table in place of a pointer value used to read data, data may be read in accordance with the storage sequence on a channel-by-channel basis.

The second mapper 330 includes a write controller (a write control circuit) 331, a read controller (a read control circuit) 332, a page controller (a page control circuit) 333, a packet buffer 334, and a PBI 335. The write controller 331 stores the write pointer control table in a memory 331a, and the read controller 332 stores the read pointer control table in a memory 332a. The page controller 333 is provided with a Link List RAM 333a and a Free PTR RAM 333b. The page controller 333 may includes a processor such as a central processing unit (CPU) and the like.

In the second mapper 330, the write controller 331 stores the input packet in the packet buffer 334, and the read controller 332 reads a packet from the packet buffer 334. Note that description of elements 331 to 334 is omitted because their functions are basically the same as elements 311 to 314.

Figure 4:
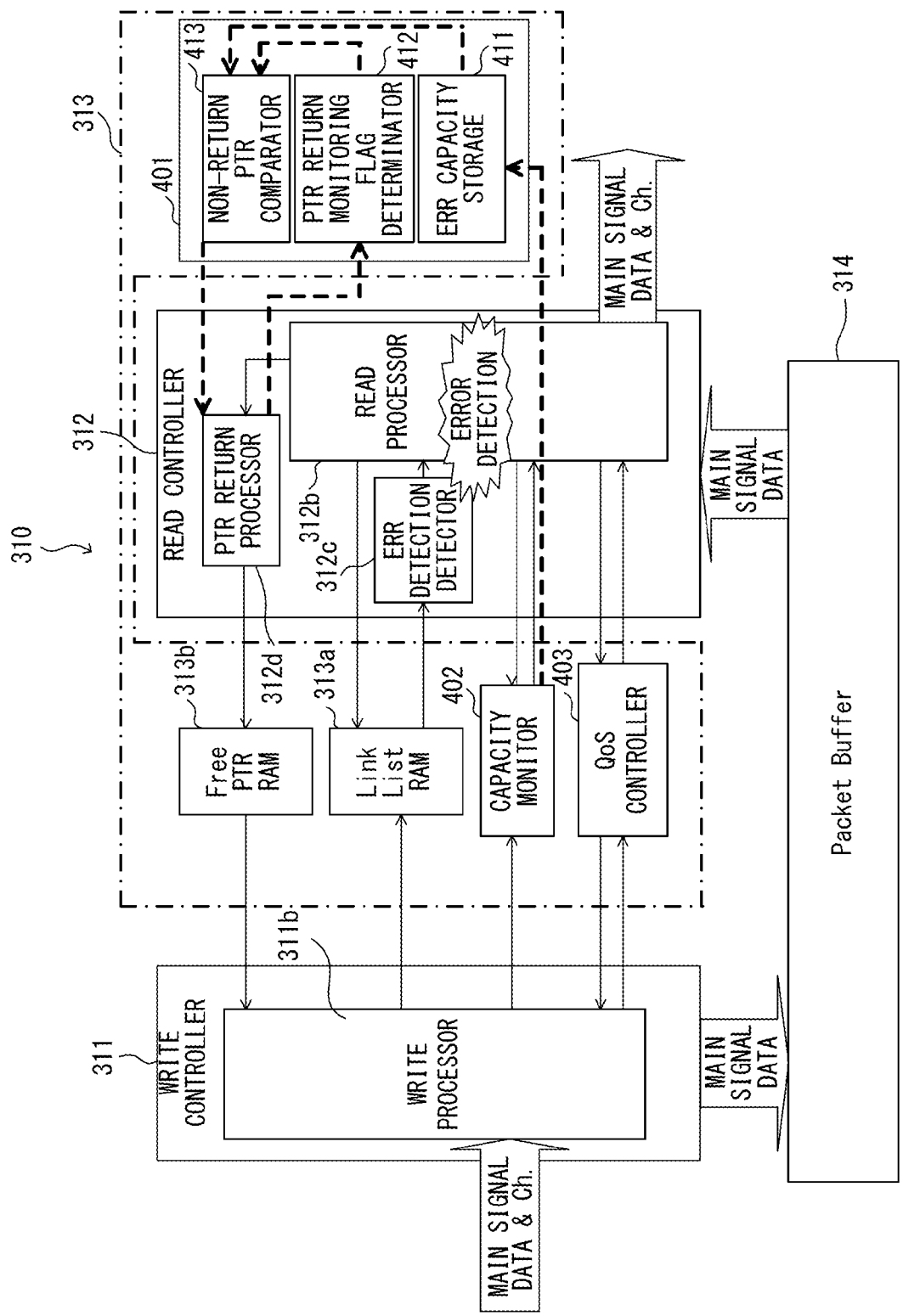
FIG. 4 illustrates a more detailed configuration of a first mapper.

FIG. 4 illustrates the more detailed circuit configuration of the first mapper.

As illustrated in FIG. 4, the write control 311 of the first mapper 310 includes a write processor 311b, and the read controller 312 includes a read processor 312b, an error (ERR) detector 312c, and a pointer return processor 312d. The page controller 333 includes a recovery controller (a recovery control circuit) 401, a capacity monitor 402, and a QoS controller (a QoS control circuit) 403 in addition to the Link List RAM 313a and the Free PTR RAM 313b. In FIG. 4, the PBI 315 is omitted. The error (ERR) detector 312c may includes a processor such as a central processing unit (CPU) and the like. However, the read processor 312b, the error (ERR) detector 312c, and the pointer return processor 312d may be realized by using one processor.

As described above, the Link List RAM 313a is used to read data from the packet buffer 314 on a channel-by-channel basis. When an error occurs in the pointer value read from the Link List RAM 313a, it becomes impossible to specify the data with the pointer value and the next pointer value, and a memory leak occurs on the packet buffer 314. The recovery controller 401 automatically deals with such a memory leak, and performs a recovery. The error which occurred in the pointer value read from the Link List RAM 313a is detected by the error detector 312c of the read controller 312.

The above unit area on which a memory leak has occurred is not released (returned), and thus remains in a busy state. The number of the unit areas that remain in a busy state is equal to the total number of the pointers that are used for data storage in the channels with the pointer values in which an error has been detected are assigned. The busy state of the unit areas is maintained unless the unit areas are released. In the present embodiment, the focus is on the above fact, and a recovery is performed in an autonomous manner by specifying and releasing the unit areas that become unable to be released due to a memory leak.

The capacity monitor 402 is provided to perform such a recovery as above, and is used to measure the number of the pointers that are in a busy state on a channel-by-channel basis. For this reason, as depicted in FIG. 5C, the capacity monitor 402 retains the number of pointers (depicted as "capacity" in FIG. 5C, hereinafter, this will be referred to as "total number of pointers") on a channel—(channel number) by-channel basis.

The recovery controller 401 includes an error (ERR) capacity storage 411, a PTR return monitoring flag (FLAG) determinator (or PTR return monitoring flag (FLAG) unit) 412, and a non-return PTR comparator 413. The error (ERR) capacity storage 411 for a memo is used to store the total number of pointers in the channel where an error has occurred in reading a pointer value. The stored total number of pointers is stored from the capacity monitor 402. Each of the PTR return monitoring flag (FLAG) determinator 412, and the non-return PTR comparator 413 may include a processor. However, the PTR return monitoring flag (FLAG) determinator 412, and the non-return PTR comparator 413 may be realized by using one processor such as a central processing unit (CPU) and the like.

The PTR return monitoring flag (Flag) determinator 412 is used to determine whether or not a returning process has been performed on a pointer-by-pointer basis. A return flag is stored in the PTR return monitoring flag (FLAG) determinator 412 on a pointer—(pointer value) by-pointer basis. When an error is detected, the value of the return flag of each pointer is set to "0", and none of the unit areas are released. Subsequently, the value of the return flag corresponding to the released unit area is updated to a value that indicates a return (for example, "1").

The non-return PTR comparator 413 compares the total number of pointers stored in the error capacity storage 411 with the number of the return flags that are set to indicate non-return in the PTR return monitoring flag determinator 412. The PTR return processor 312d of the read control 312 is notified of the result of that comparison, i.e., whether or not these two values match.

When the PTR return processor 312d is notified of a match by the non-return PTR comparator 413, the PTR return processor 312d refers to the PTR return monitoring flag determinator 412, and obtains the pointer value of the return flags that indicate non-return. The obtained pointer value is written into the Free PTR RAM 313b, and unit area into which the data is written is released.

The pointers that do not fall in a non-return state due to a memory leak are used to write data into the packet buffer 314, and thus their return flags are updated to a value that indicates a return. Accordingly, the match between the total number of pointers stored in the error capacity storage 411 and the number of the return flags that are set to indicate non-return in the PTR return monitoring flag determinator 412 indicates that all the pointers that do not fall in a non-return state due to a memory leak have been returned once. In other words, the pointers that have not yet been returned when the above numbers match have never been returned due to a memory leak. Accordingly, it becomes possible to release all the unit areas that remain in a busy state due to an error, by identifying and returning such pointers that have not yet been returned.

Figure 14:
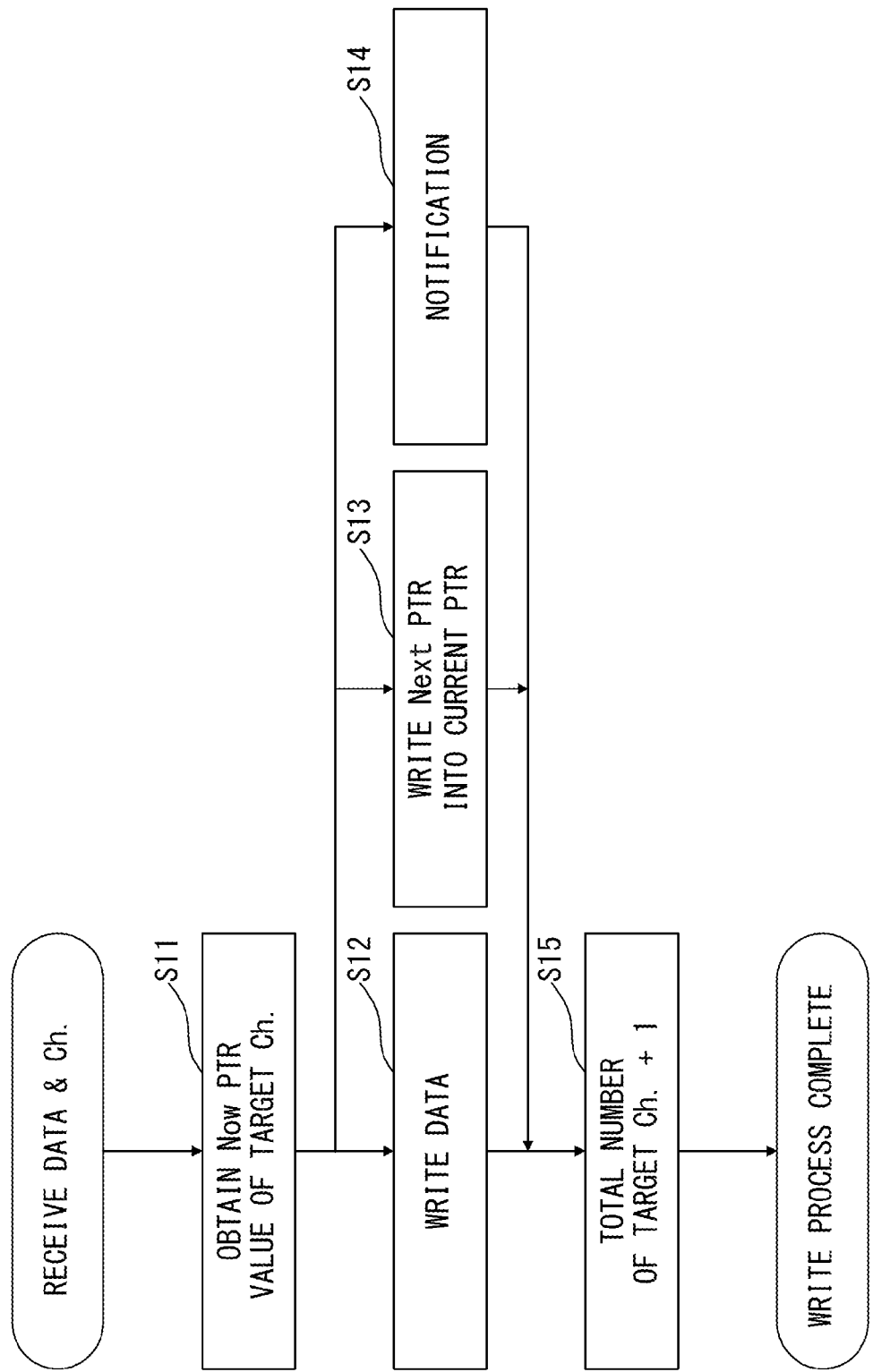
FIG. 14 is a flowchart of writing processes.

Due to the provision of the capacity monitor 402 as above, when data (segment) is input from the input processor 302, the write processor 311b of the write controller 311 performs processes in accordance with the flowchart illustrated in FIG. 14. The operation of the write processor 311b will be described in detail with reference to FIG. 14.

The write processor 311b to which data and a channel number are input from the input processor 302 obtains the current pointer value of that channel number from the write pointer control table of the memory 311a (S11), and stores the data (segment) inputted to the unit area with the obtained current pointer value in the packet buffer 314 (S12). While the data is stored, an update of the write pointer control table (S13) and a notification to the QoS controller 403 (S14) are performed. Subsequently, the write processor 311b obtains the total number of the pointers with the input channel number from the capacity monitor 402, and writes a value obtained by incrementing the obtained total number of the pointers into the capacity monitor 402 as the new total number of pointers (S15).

The above update of the write pointer control table is performed by overwriting the current pointer value corresponding to the input channel number with a current pointer value, and by overwriting the next pointer value with the pointer value obtained from the Free PTR RAM 313b. The QoS controller 403 is notified of the number of the channel with which data is written into the packet buffer 314. In response to that notification, the QoS controller 403 instructs the read control circuit 312 to read data on a channel-by-channel basis in accordance with the priority of data transmission.

On the other hand, in response to the channel specification given from the QoS controller 403 to the read processor 312b of the read controller 312, the read controller 312 and the recovery controller 401 of the page controller 313 perform processes in accordance with the flowchart illustrated in FIG. 15. The operations of the read controller 312 and the recovery controller 401 of the page controller 313 will be described in detail with reference to FIG. 15.

When the number of the channel from which data is to be read is obtained from the QoS controller 403, the read processor 312b of the read controller 312 uses the obtained channel number and refers to the read pointer control table of the memory 312a, and reads the pointer value with that channel number (S21). Next, the read controller 312b reads data from the unit area in the packet buffer 314 with the pointer value (S22).

After data is read, the read processor 312b refers to the Link List RAM 313a, and reads the next pointer value stored as the data with the above pointer value (S23). The error detector (detection unit) 312c uses an ECC (Error Correcting Code) or the like that is read together with that pointer value to detect an error that is present in the pointer value read from the Link List RAM. 313a, and notifies the read processor 312b of the detection result. According to the notification from the error detector 312c, the read processor 312b determines whether or not an error has been detected in the read pointer value.

When it is determined that an error has been detected, the read processor 312b notifies the write processor 311b of the write controller 311 of the obtained channel number, and obtains the current pointer value of that channel number in the write pointer control table from the write processor 311b. The read processor 312b stores the obtained current pointer value as the pointer value with the obtained channel number in the read pointer control table (S25). Due to such an reconstruction of the read pointer control table, in the channel where an error has occurred in reading a pointer value, it becomes possible to deal with the data written into the packet buffer 314 after an error has occurred.

On the other hand, the read processor 312b obtains the total number of the pointers with the specified target channel number from the capacity monitor 402 and stores the obtained total number of the pointers in the error capacity storage 411 (S26), and clears the total number of the pointers with that target channel number in the capacity monitor 402 to "0" (S27). Moreover, the read processor 312b clears the value of the return flag on each pointer of the PTR return monitoring flag determinator 412 to "0" (S29).

When an error is detected in the reading process of a pointer value from the Link List RAM 313a, the read controller 312b performs initial settings for performing recovery and performs reconstruction that enables data transmission in the channel to which error detected pointers are assigned, as described above. By so doing, it becomes possible to perform recovery in an independent manner, and in a channel that is directly affected by a memory leak, it becomes possible to start data transmission again in an expeditious manner.

Note that an error may occur while a recovery is in progress. For this reason, in fact, the read controller 312b is configured to refer to the total number of pointers that are currently stored in the error capacity storage 411, and when the total number of pointers is equal to or greater than "1", the value obtained by adding the total number of pointers to the total number of the pointers obtained from the capacity monitor 402 is stored in the error capacity storage 411.

When it is determined that no error will remain undetected in the read pointer value, the read processor 312b stores the pointer value as the data of the specified channel number of the read pointer control table (S30). Moreover, the read processor 312b notifies the PTR return processor 312d of the value of the pointer with which data is read from the packet buffer 314, and instructs the PTR return processor 312d to return the specified pointer (S31).

After the error is recovered, a negative value is stored in the error capacity storage 411 as the total number of pointers. The read processor 312b determines whether the total number of pointers stored in the error capacity storage 411 is greater than "0" (S32). When it is determined that the total number of pointers is greater than "0" ("Yes" in S32), the read processor 312b sets the return flag set to the value of the pointer with which data is read from the packet buffer 314 in the PTR return monitoring flag determinator 412 to return (S33). When it is determined that the total number of pointers is less than "0" ("No" in S32), the read processor 312b terminates the series of processes.

After the value of the return flag is changed by the read processor 312b, the non-return PTR comparator 413 of the recovery controller 401 compares the total number of pointers stored in the error capacity storage 411 with the number of the return flags that are set to indicate non-return in the PTR return monitoring flag determinator 412. As a result of the comparison, the non-return PTR comparator 413 notifies the PTR return processor 312d of whether or not the total number of pointers matches the number of the return flags. According to the notification, the PTR return processor 312d determines whether or not the total number of pointers matches the number of the return flags (S34). When it is determined that these values match ("Yes" in S34), the PTR return processor 312d refers to the PTR return monitoring flag determinator 412 and obtains the pointer value of the return flags that indicate non-return, and writes the obtained pointer value into the Free PTR RAM 313b (S35). The relevant pointer is returned according to the written pointer value, and then the series of processes that are performed by the read processor 312b and the recovery controller 401 terminates.

Here, how a memory leak caused by an error is dealt with by the read controller 312 and the recovery controller 401 of the page controller 313 as described above will be described in detail with reference to FIGS. 6-13B.

Figure 6:
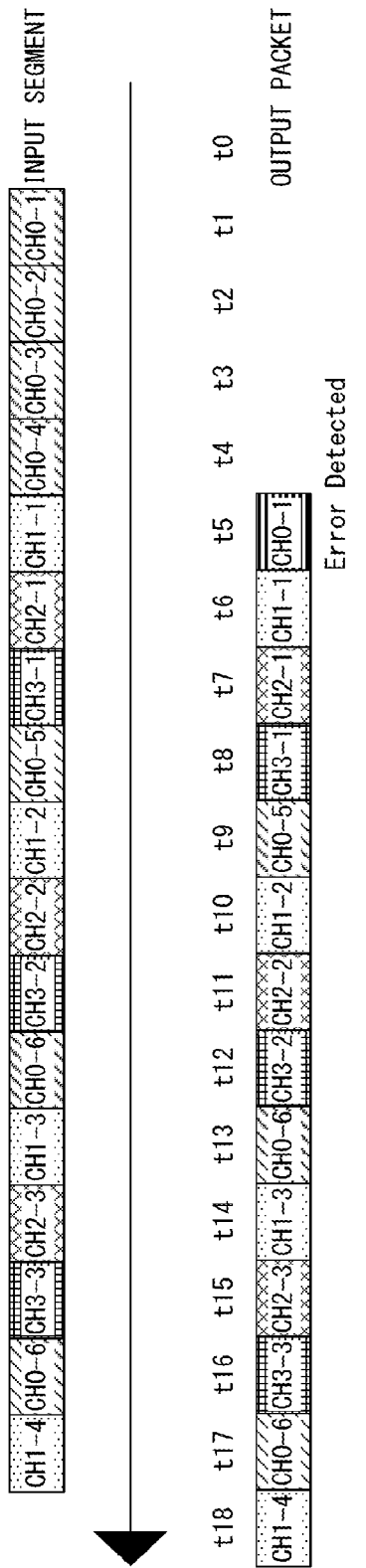
FIG. 6 illustrates an example of the sequence of a segment inputted to a first mapper and an example of the sequence of a packet outputted from the first mapper.

FIG. 6 illustrates an example of the sequence of a segment that is inputted to a first mapper and an example of the sequence of a packet outputted from the first mapper. In FIG. 6, "CH0" to "CH3" indicate the channels whose channel numbers are "0" to "3", respectively, and the hyphens and numbers next to these symbol strings indicate the order in which the data of the relevant channel is inputted or outputted. Accordingly, for example, "CH0-1" indicates the data that is firstly inputted or outputted among pieces of data whose channel numbers are "0".

Figure 7A:
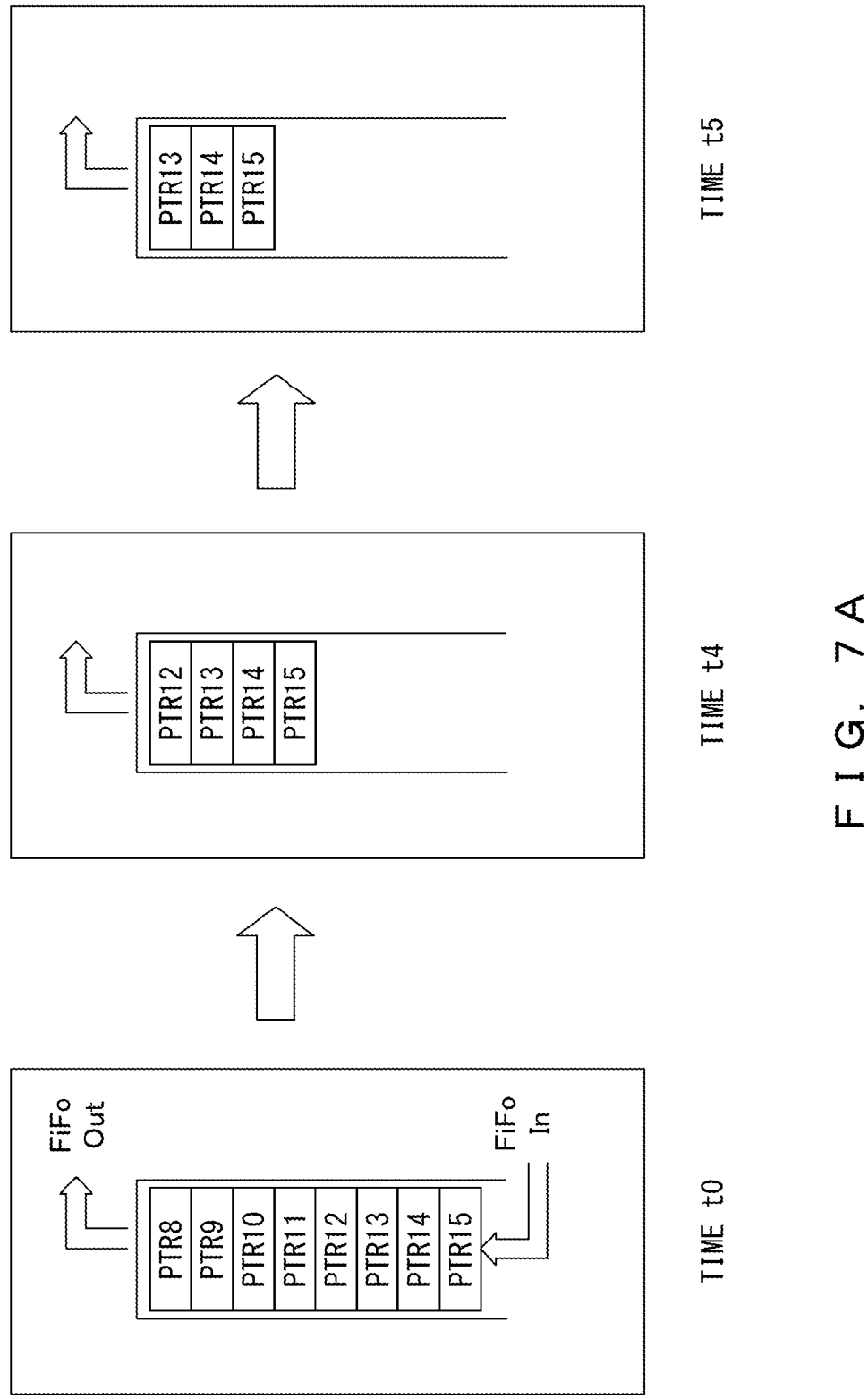
FIG. 7A illustrate how the contents of a Free PTR RAM change.
Figure 7B:
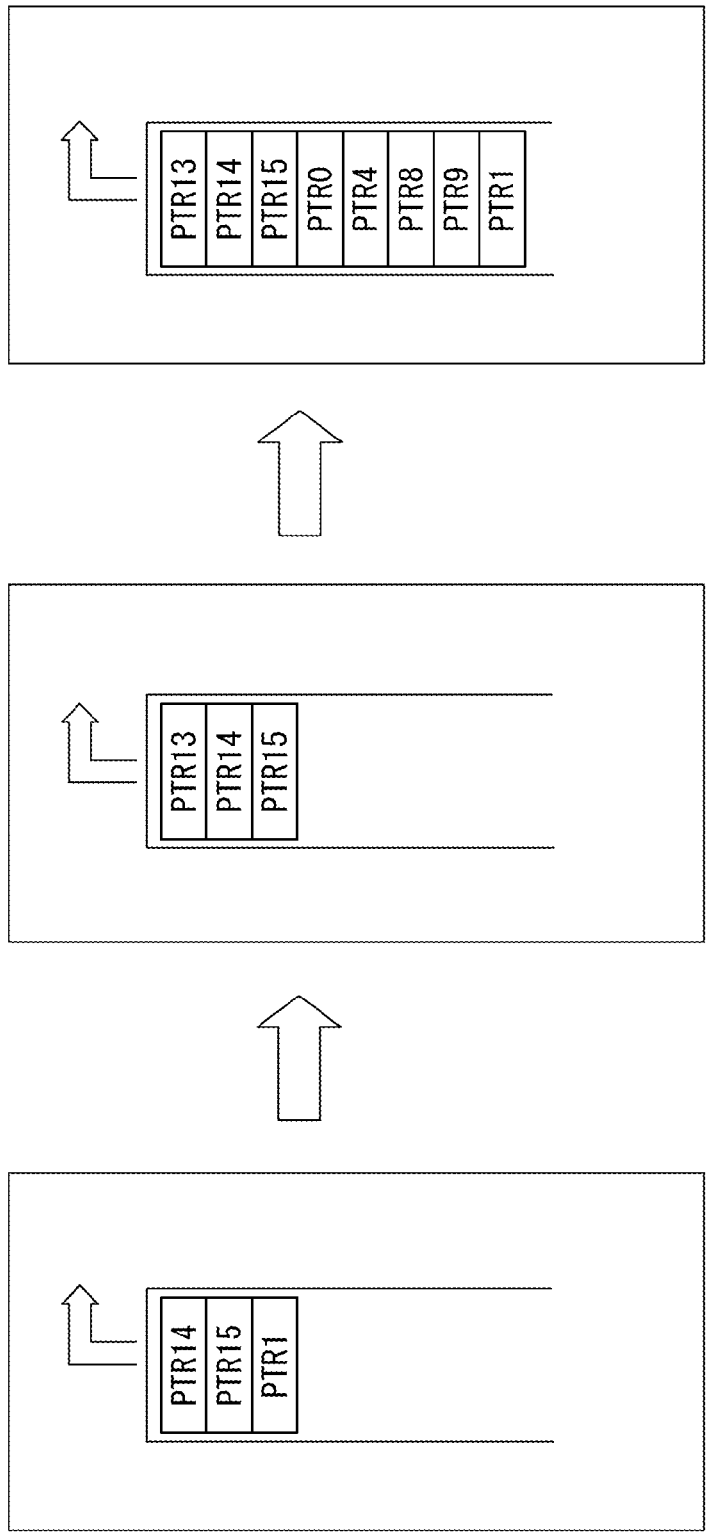
FIG. 7B illustrate how the contents of a Free PTR RAM change.
Figure 13A:
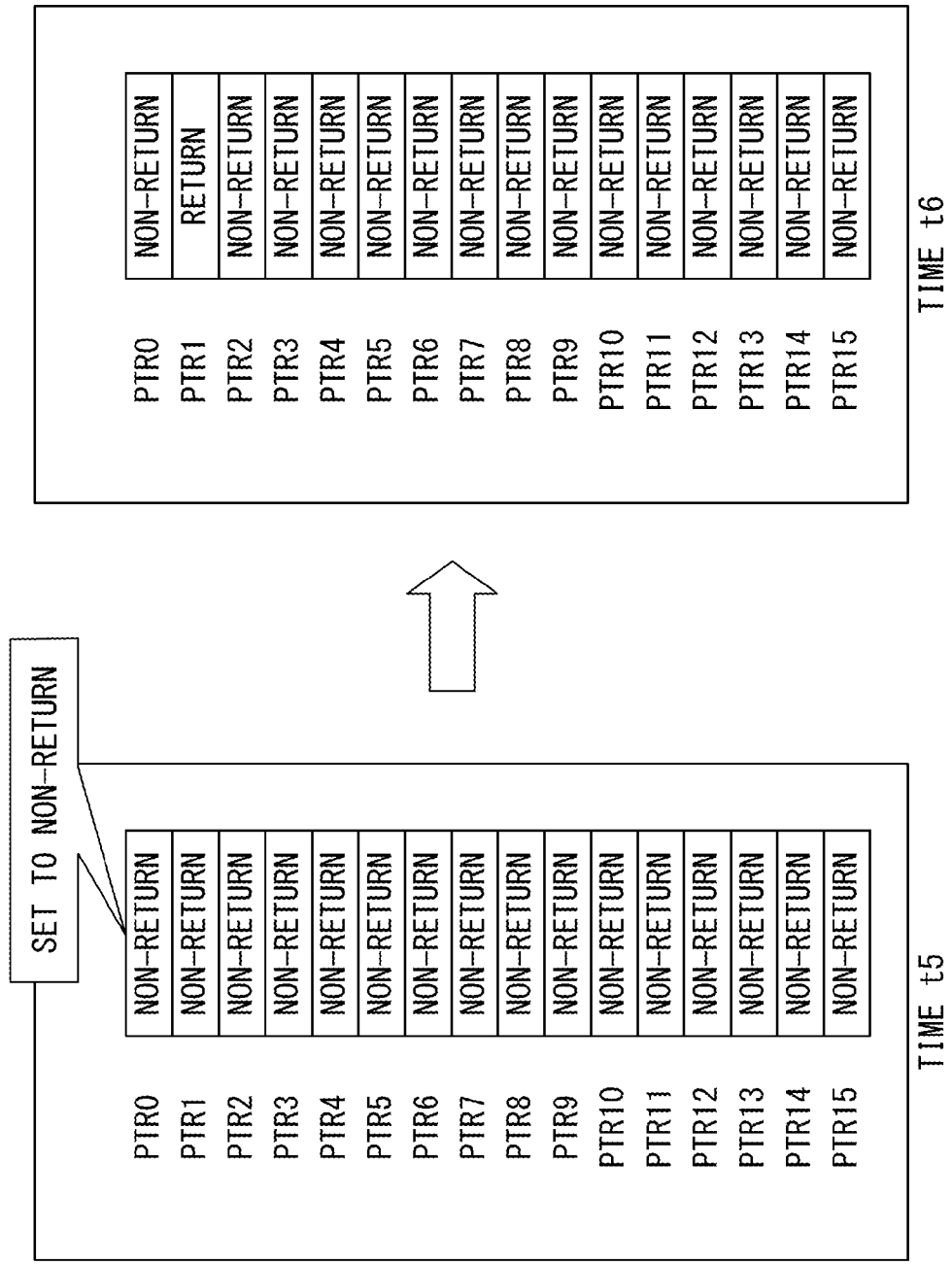
FIG. 13A illustrates how the contents stored in a PTR return monitoring flag determinator change.
Figure 13B:
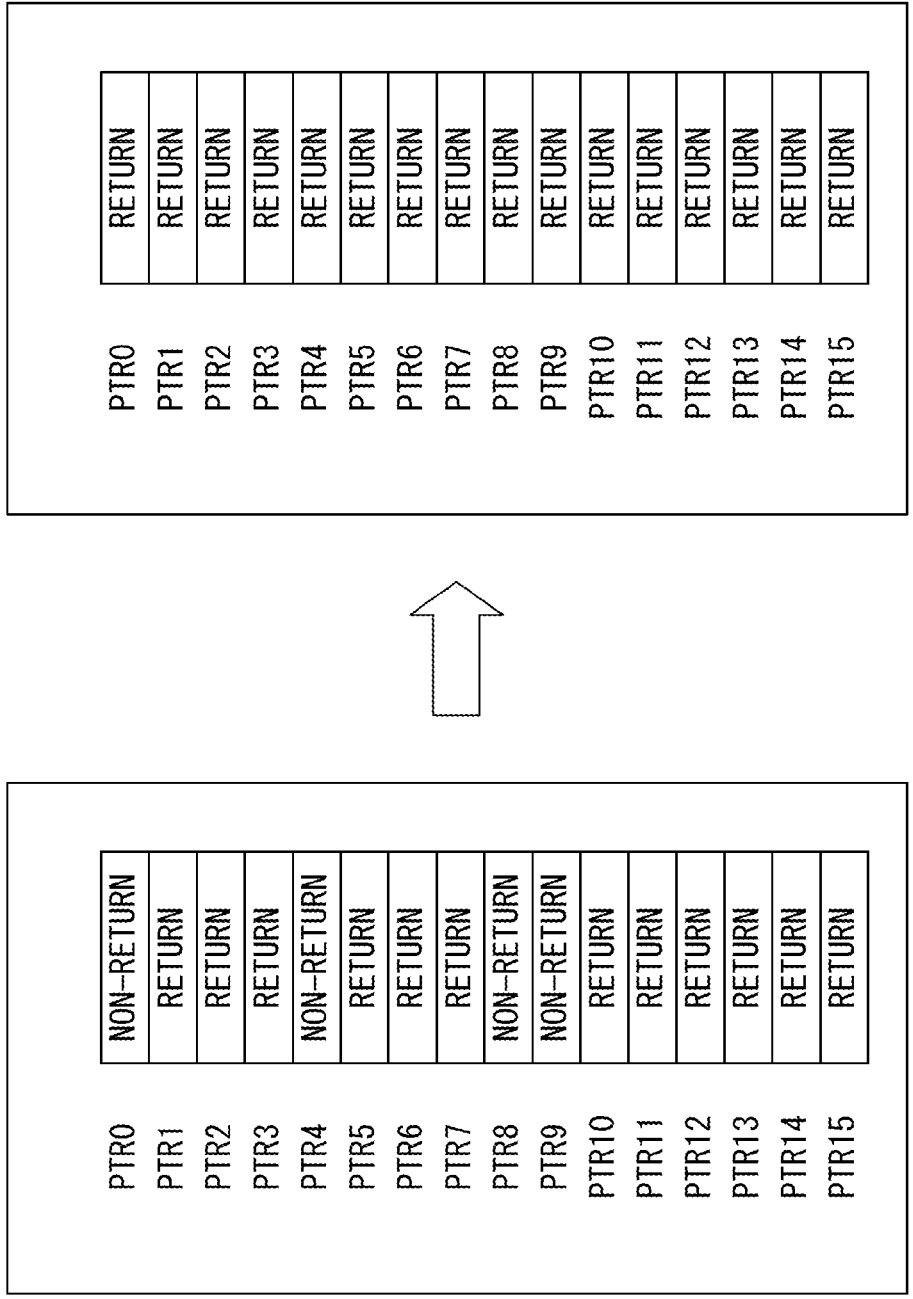
FIG. 13B illustrates how the contents stored in a PTR return monitoring flag determinator change.

FIGS. 7A-13B are explanatory schematic diagrams in which how the contents of the Free PTR RAM 313b, the write pointer control table, the Link List RAM 313a, the packet buffer 314, the read pointer control table, the capacity monitor 402, and the PTR return monitoring flag determinator 412 change when a segment is inputted or a packet is outputted as depicted in FIG. 6 is selectively illustrated. FIG. 7A and FIG. 7B illustrate how the contents of the Free PTR RAM 313b change. FIG. 8A and FIG. 8B illustrate how the contents of the write pointer control table change. FIG. 9A and FIG. 9B illustrate how the contents of the Link List RAM 313a change. FIG. 10A and FIG. 10B illustrate how the contents of the packet buffer 314 change. FIG. 11A and FIG. 11B illustrate how the contents of read pointer control table change. FIG. 12A and FIG. 12B illustrate how the contents of the capacity monitor 402 change. FIG. 13A and FIG. 13B illustrate how the contents of the PTR return monitoring flag determinator 412 change. In FIGS. 7A-13B, "PTR0" to "PTR15" indicate pointer values that are different from each other. In FIG. 13A and FIG. 13B, "return" indicates a return flag to which a value that indicates return is set, and "non-return" indicates a return flag to which a value that indicates no-return is set.

Figure 8A:
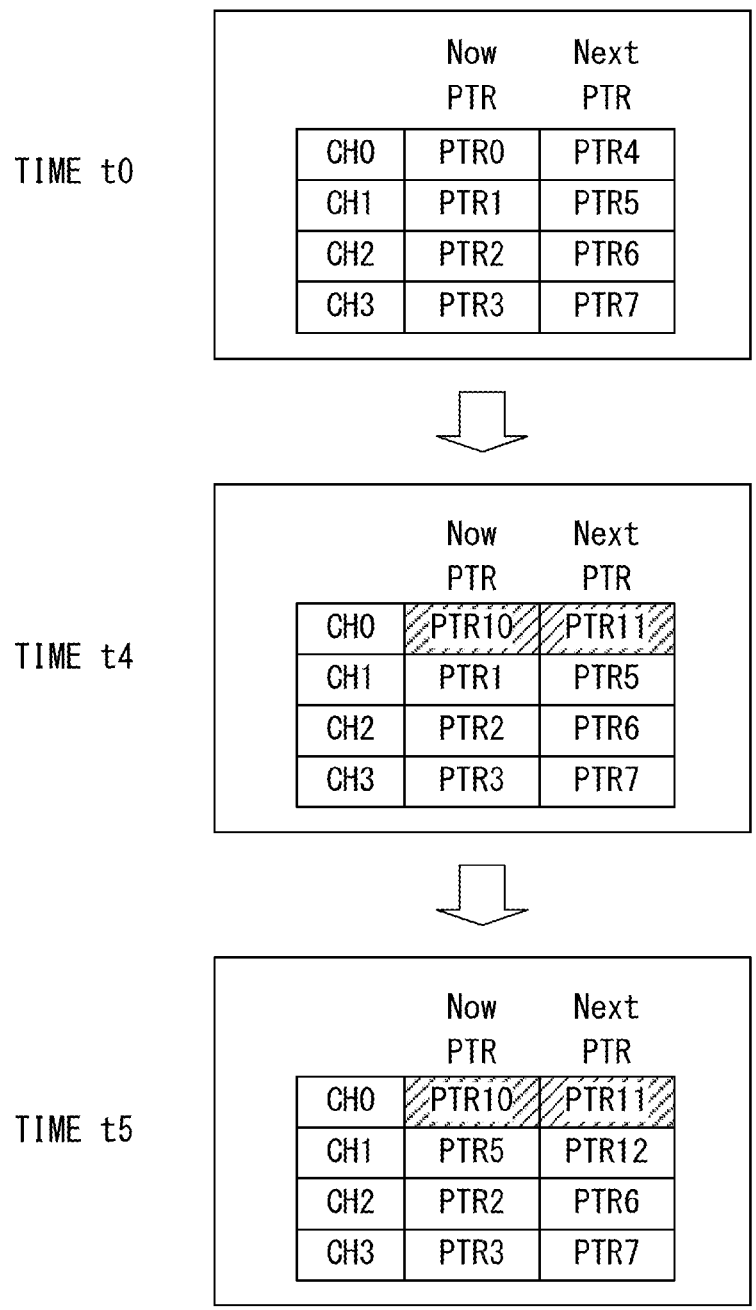
FIG. 8A illustrate how the contents of a write pointer control table change.
Figure 8B:
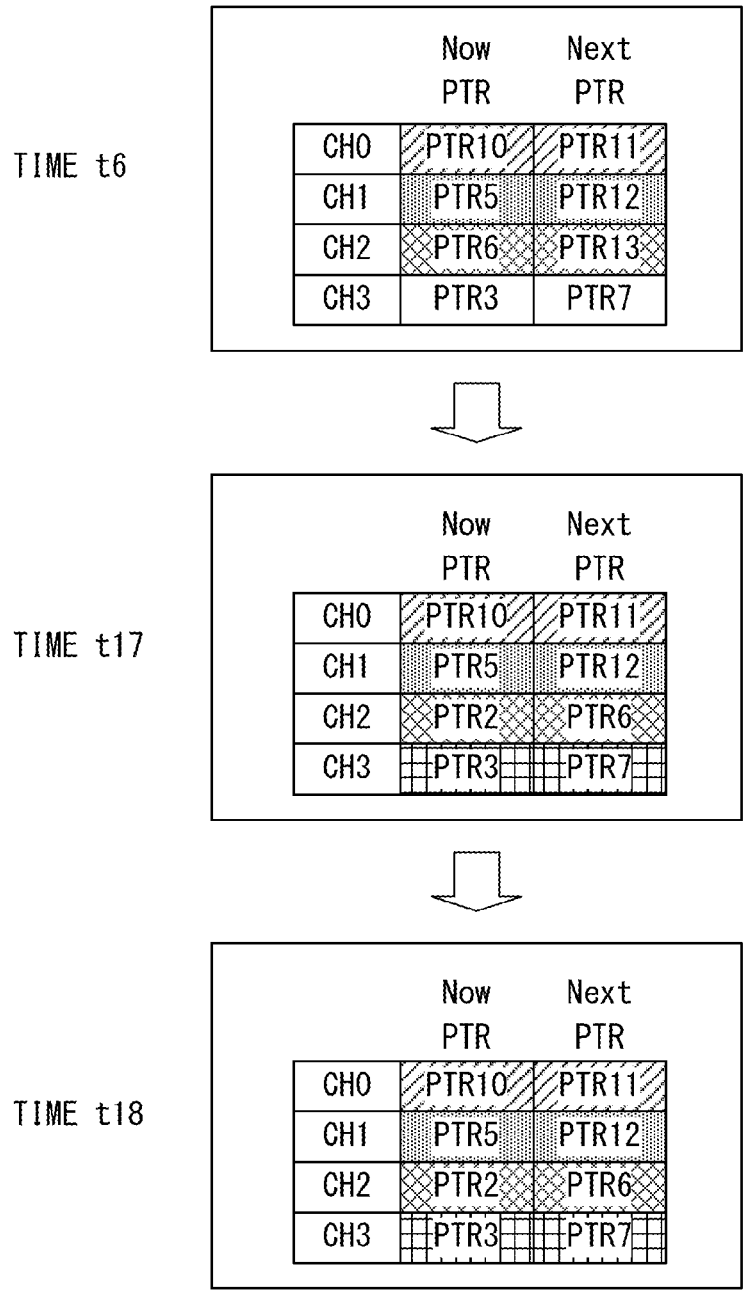
FIG. 8B illustrate how the contents of a write pointer control table change.

For the sake of convenience, here, it is assumed that the Free PTR RAM 313b and the write pointer control table include the contents as depicted in FIG. 7A and FIG. 8A, respectively, at a time t0. It is also assumed that no data is stored in the Link List RAM 313a, the packet buffer 314, the read pointer control table, the capacity monitor 402, and the PTR return monitoring flag determinator 412, respectively. The value "0" that is stored in the capacity monitor 402 indicates that the total number of the pointers in the relevant channel is "0". It is assumed that an error is detected when a pointer value is read from the Link List RAM 313a at a time t5. In particular, it is assumed that a pointer value PTR4 is read as a pointer value PTR12 due to an error. Moreover, for the purpose of facilitating understanding, significant simplification is made in comparison to the actuality by assuming that one segment corresponds to the amount of the data of one packet, i.e., one segment corresponds to one packet, and by assuming that the packet buffer 314 is divided into sixteen pointers.

Figure 9A:
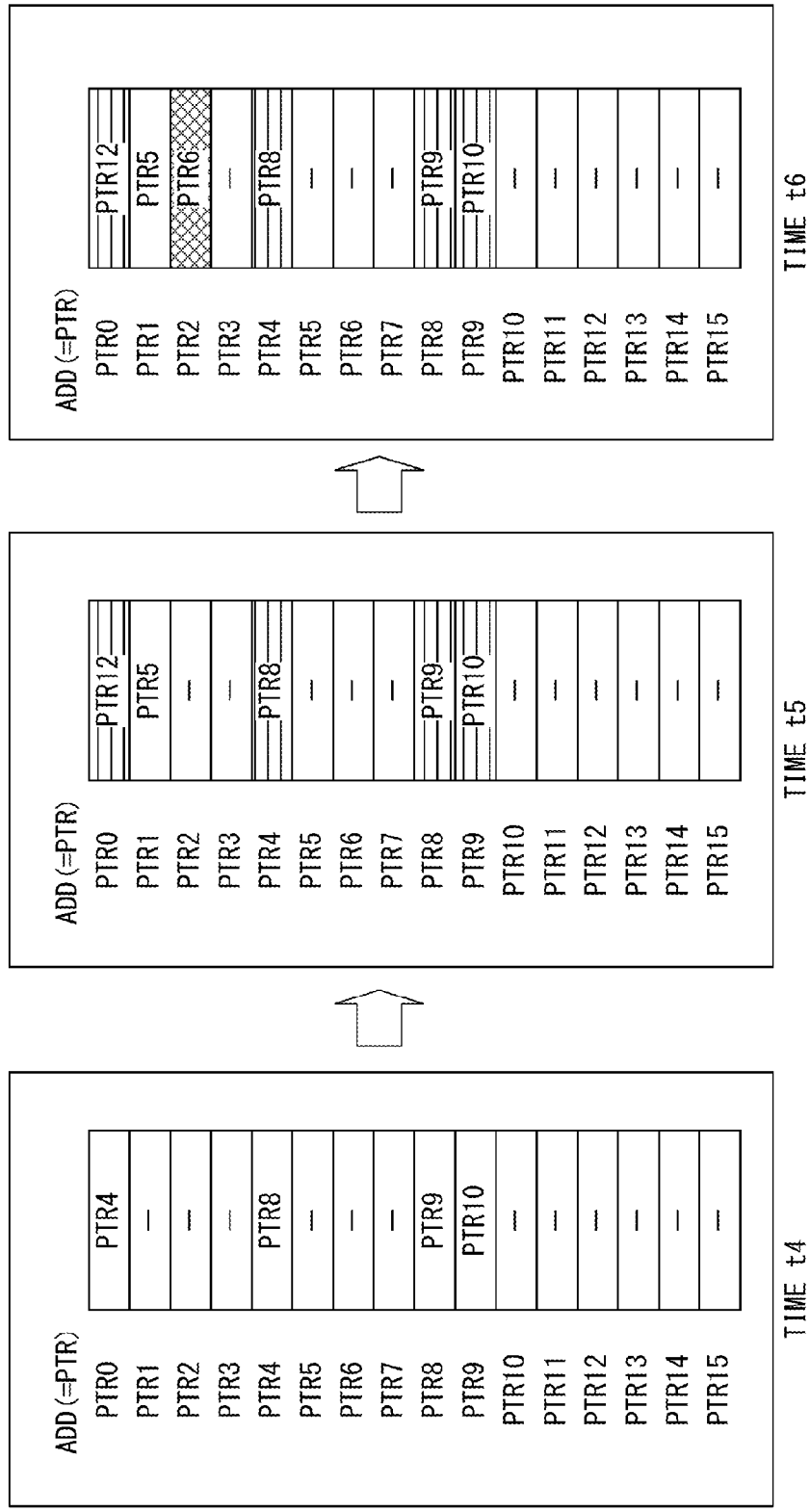
FIG. 9A illustrate how the contents of a Link List RAM change.
Figure 9B:
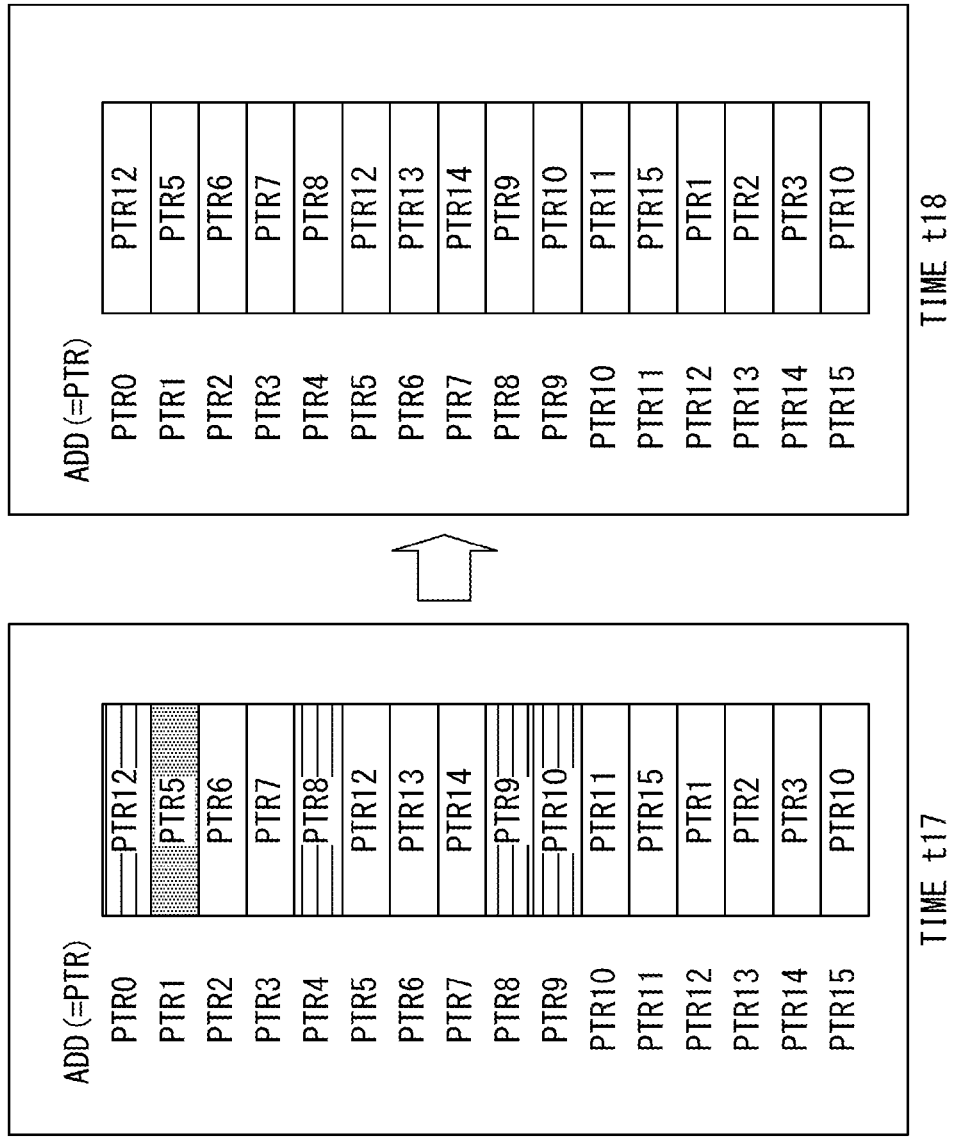
FIG. 9B illustrate how the contents of a Link List RAM change.
Figure 10A:
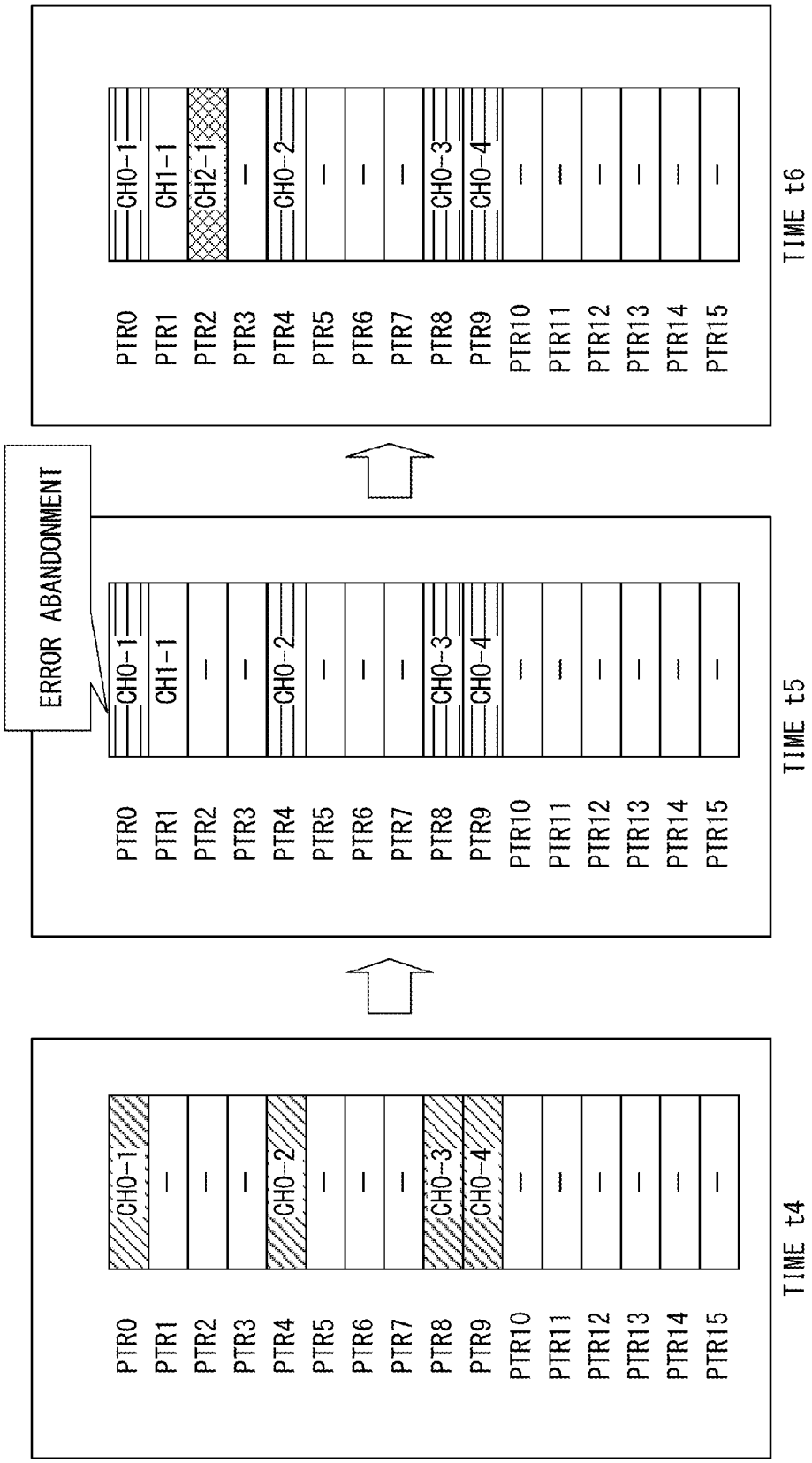
FIG. 10A illustrates how the contents stored in a packet buffer change.
Figure 10B:
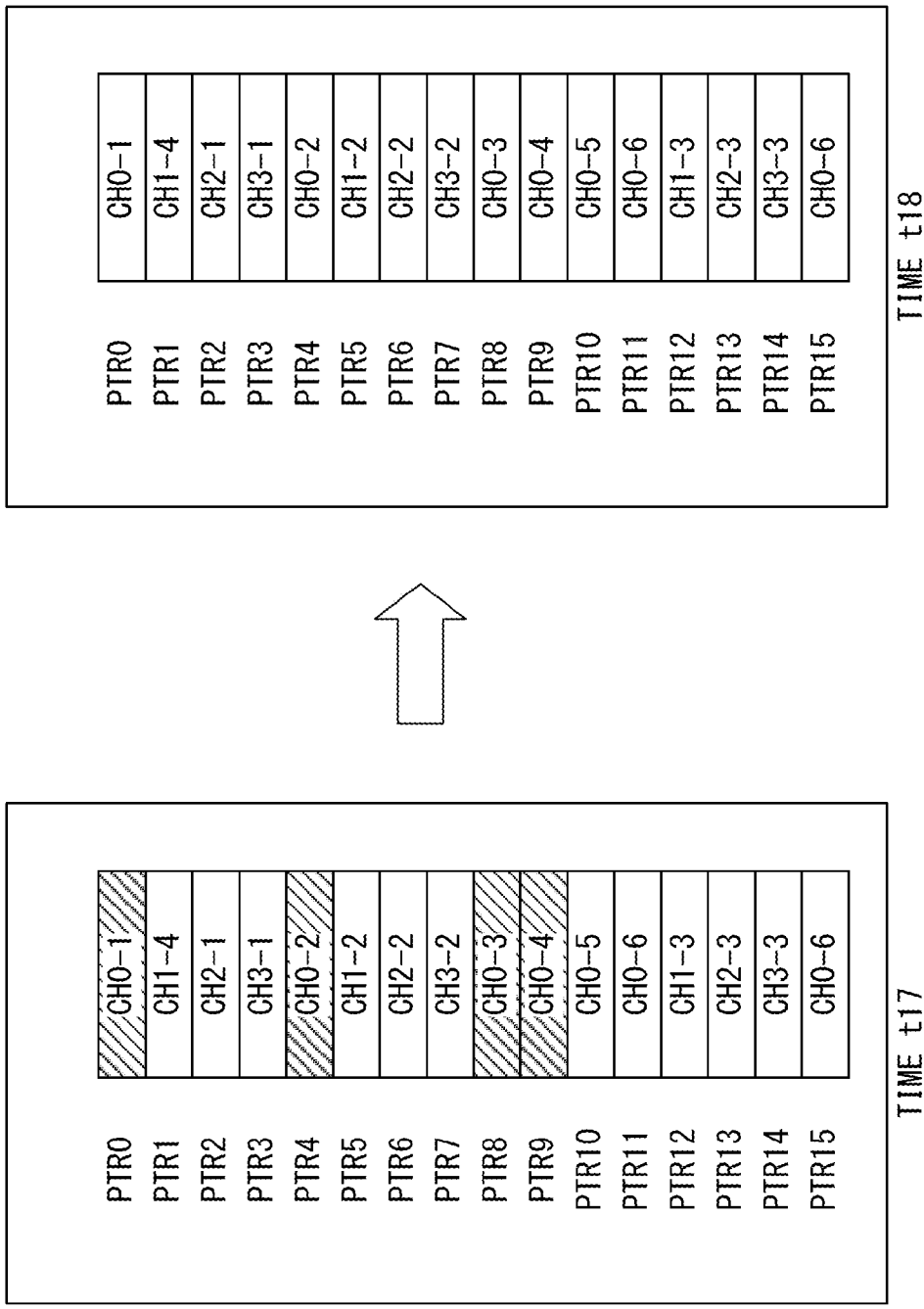
FIG. 10B illustrates how the contents stored in a packet buffer change.
Figure 12A:
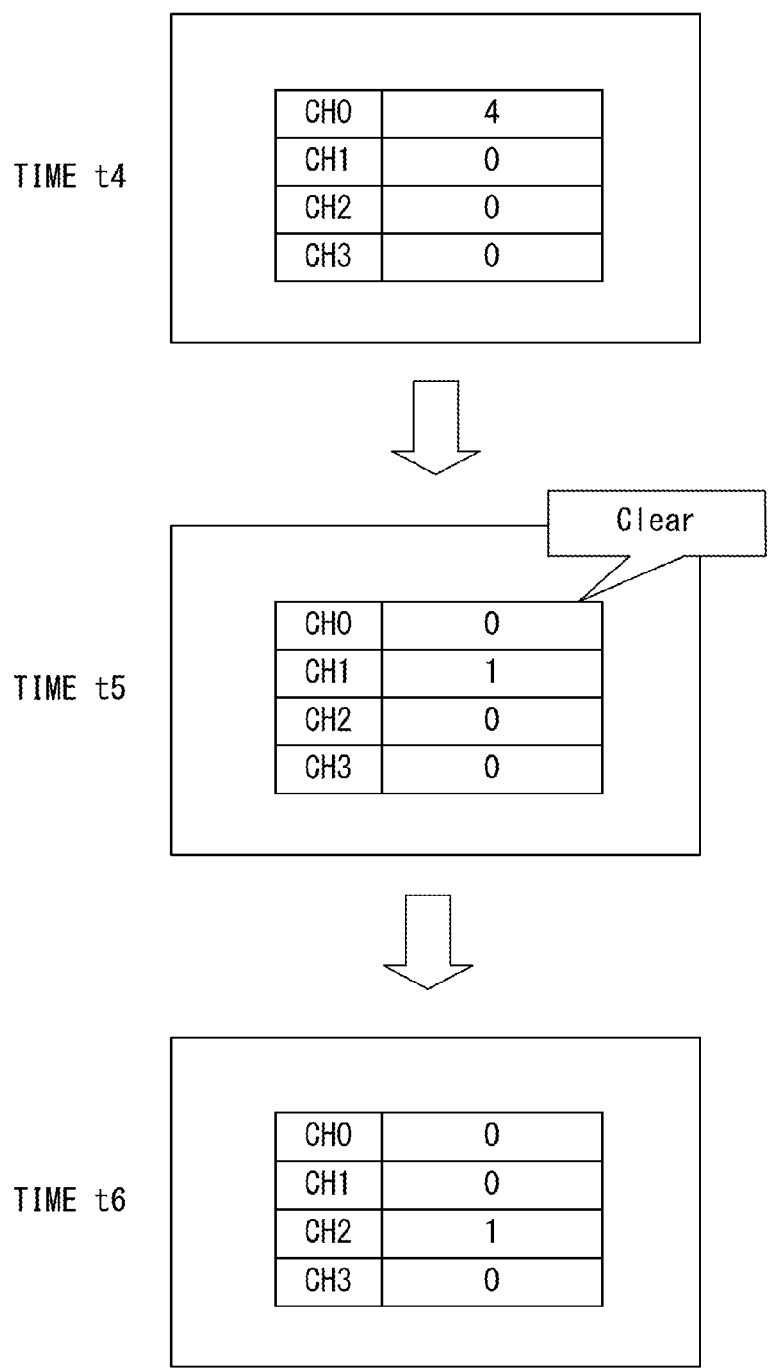
FIG. 12A illustrates how the contents stored in a capacity monitor change.
Figure 12B:
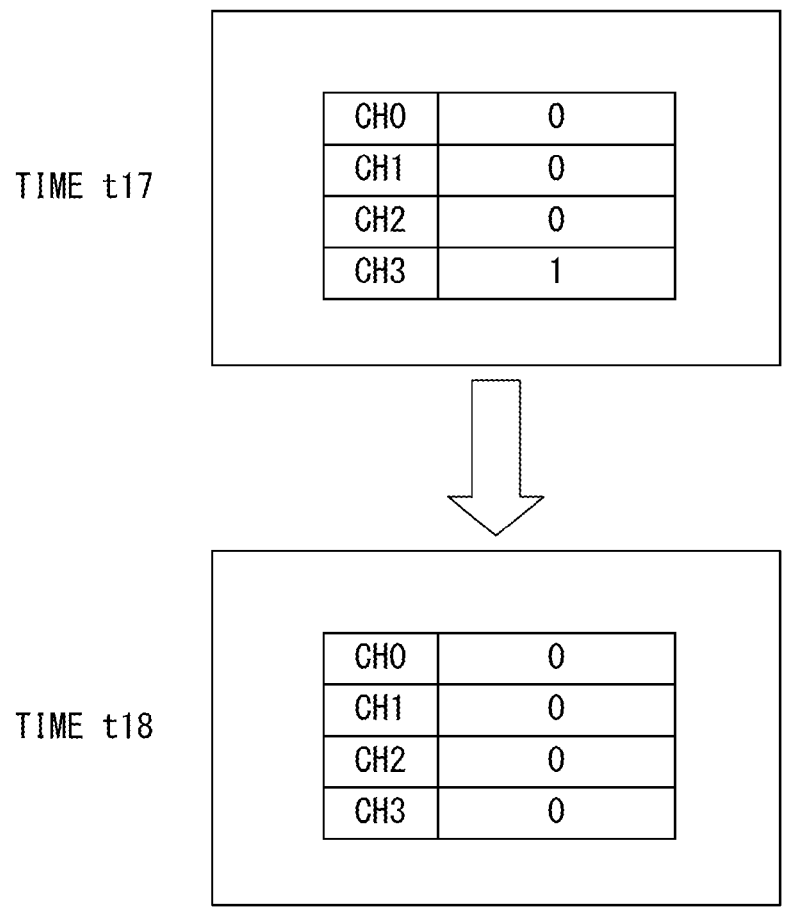
FIG. 12B illustrates how the contents stored in a capacity monitor change.

Due to the above error detection, it becomes impossible to return the PTR0, PTR4, PTR8, and PTR9 of the packet buffer 314 (see FIG. 9A and FIG. 10A). Note that the return flags of the PTR return monitoring flag determinator 412 indicate non-return (see FIG. 13A). The total number of pointers with channel number 0 in the capacity monitor 404 is four at a time t5. Accordingly, "4" is stored in the error capacity storage 411.

At a time t17, four of the return flags of the PTR return monitoring flag determinator 412 indicate non-return (see FIG. 13B). Accordingly, the number of return flags that indicate non-return is equivalent to the total number of pointers stored in the error capacity storage 411. As a result, the pointers whose return flags indicate non-return will be returned at a time t18.

In the present embodiment, errors that occur when a pointer value is read from the Link List RAM. 313a are dealt with, but errors that occur in a different situation may be dealt with. The ADM 10 to which the present embodiment is applied is configured to perform both QoS control (adjustment of the timing at which the received data is transmitted) and data conversion (conversion from a segment to a packet, and vice versa). The present embodiment may be applied to a node that performs only one of the QoS control and the data conversion. The present embodiment may be widely applied to a relay device that temporarily stores data and relays the data by using a storage device. Note that the data conversion is not limited to the above configuration.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay device for dividing a storage device into a plurality of unit areas, assigning an unused unit area from among the plurality of unit areas to receiving data for which a channel has been specified, and performing at least one of adjustment of a transmission timing of the data and conversion of the data by using the assigned unit area, the relay device comprising:
 a capacity monitor which measures, for the channel, a number of the unit areas being used in the storage device;
 an error detector which detects an error where the unit area from which the data is to be read is not specified;
 an error capacity storage which stores the measured number of the unit areas when the error detector detects the error;
 a return monitoring flag determinator which specifies unused unit areas among the plurality of unit areas of the storage device after the error detector has detected the error; and
 a return processor which invalidates an assignment of the specified unused unit areas when a number of the specified unused unit areas is equal to the measured number of the unit areas stored in the error capacity storage.

2. The relay device according to claim 1, further comprising
 a processor which instructs the capacity monitor to clear the measured number of the unit areas after the measured number of the unit areas is stored in the error capacity storage, wherein the return processor releases, as assignable unused unit areas, the specified unused unit areas of which assignment has been invalidated.

3. The relay device according to claim 2, wherein
when the error detector detects the error again before the release is performed by the return processor, the error capacity storage updates the stored number of the unit areas by adding the number of the unit areas measured by the capacity monitor to the stored number of the unit areas, and when the stored number of the unit areas is updated, the return monitoring flag determinator specifies an unused unit area from among the plurality of unit areas of the storage device from scratch.

4. A method for performing recovery by using a relay device for dividing a storage device into a plurality of unit areas, assigning an unused unit area among the plurality of unit areas to received channel-specified data, and performing at least one of adjustment of a transmission timing of the data and conversion of the data by using the assigned unit area, the method comprising:

measuring a number of the unit areas being used in the storage device on a channel-by-channel basis;

when an error where the unit area from which the data is to be read is not specified is detected, recognizing a channel in which the error is detected as a target channel and storing a number of areas measured in the target channel as a first number of areas;

specifying unused unit areas among the plurality of unit areas of the storage device after the error has been detected; and releasing all of the unused unit areas when a number of the specified unused unit areas becomes equal to the first number of areas.

\* \* \* \* \*